US011599621B2

(12) United States Patent
Shanbhogue et al.

(10) Patent No.: US 11,599,621 B2
(45) Date of Patent: Mar. 7, 2023

(54) APPARATUSES, METHODS, AND SYSTEMS FOR VERIFICATION OF INPUT-OUTPUT MEMORY MANAGEMENT UNIT TO DEVICE ATTACHMENT

(71) Applicant: Intel Corporation, Santa Clara, CA (US)

(72) Inventors: Vedvyas Shanbhogue, Austin, TX (US); Rajesh Sankaran, Portland, OR (US); Abhishek Basak, Hillsboro, OR (US); Pradeep Pappachan, Hillsboro, OR (US); Utkarsh Y. Kakaiya, Folsom, CA (US); Ravi Sahita, Portland, OR (US); Rupin Vakharwala, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 921 days.

(21) Appl. No.: 16/370,921

(22) Filed: Mar. 30, 2019

(65) Prior Publication Data
US 2019/0228145 A1 Jul. 25, 2019

(51) Int. Cl.
*G06F 21/44* (2013.01)
*G06F 13/16* (2006.01)
*G06F 3/06* (2006.01)
*G06F 21/79* (2013.01)

(52) U.S. Cl.
CPC .......... *G06F 21/44* (2013.01); *G06F 3/0622* (2013.01); *G06F 3/0659* (2013.01); *G06F 3/0673* (2013.01); *G06F 13/1668* (2013.01); *G06F 21/79* (2013.01)

(58) Field of Classification Search
None
See application file for complete search history.

(56) References Cited

U.S. PATENT DOCUMENTS

| 2013/0007332 | A1* | 1/2013 | Teh ....................... G06F 13/385 710/313 |
| 2017/0249106 | A1* | 8/2017 | Apfelbaum ......... G06F 12/1433 |
| 2017/0286326 | A1* | 10/2017 | Guim ................. G06F 12/1009 |
| 2018/0011651 | A1 | 1/2018 | Sankaran et al. |
| 2019/0042463 | A1 | 2/2019 | Shanbhogue et al. |

(Continued)

OTHER PUBLICATIONS

Burger TW., "Intel Virtualization Technology for Directed I/O (VT-d): Enhancing Intel platforms for efficient Virtualization of I/O devices," published on Mar. 5, 2012, retrieved from https://software.intel.com/en-us/articles/intel-virtualization-technology-for-directed-io-vt-d-enhancing-intel-platforms-for-efficient-virtualization-of-io-devices, 20 pages.

(Continued)

*Primary Examiner* — Idriss N Alrobaye
*Assistant Examiner* — Dayton Lewis-Taylor
(74) *Attorney, Agent, or Firm* — Nicholson De Vos Webster & Elliott LLP

(57) ABSTRACT

Systems, methods, and apparatuses relating to performing an attachment of an input-output memory management unit (IOMMU) to a device, and a verification of the attachment. In one embodiment, a protocol and IOMMU extensions are used by a secure arbitration mode (SEAM) module and/or circuitry to determine if the IOMMU that is attached to the device requested to be mapped to a trusted domain.

24 Claims, 20 Drawing Sheets

(56) References Cited

U.S. PATENT DOCUMENTS

2020/0133878 A1* 4/2020 Asaro ................ G06F 12/1009

OTHER PUBLICATIONS

Mulnix D., "Intel Trusted Execution Technology (Intel TXT) Enabling Guide," published on Mar. 28, 2014, retrieved from https://software.intel.com/en-us/articles/intel-trusted-execution-technology-intel-txt-enabling-guide#_Toc383534416, 46 pages.

Nguyen K.T., "New Reliability, Availability, and Serviceability (RAS) Features in the Intel® Xeon® Processor Family," published on Jun. 20, 2017, retrieved from https://software.intel.com/en-us/articles/new-reliability-availability-and-serviceability-ras-features-in-the-intel-xeon-processor, 6 pages.

PCI Express., "PCI Express® Base Specification," Revision 4.0, Version 1.0, Sep. 27, 2017, 1293 pages.

Wikipedia., "Input-output memory management unit," last edited on Dec. 1, 2018, retrieved from https://en.wikipedia.org/wiki/Input%E2%80%93output_memory_management_unit, 4 pages.

Wikipedia., "I/O Advanced Programmable Interrupt Controller—IOAPIC," last modified on Jan. 7, 2019, retrieved from https://wiki.osdev.org/IOAPIC, 6 pages.

European Search Report and Search Opinion, EP App. No. 20154767.6, dated Jul. 16, 2020, 9 pages.

Office Action, EP App. No. 20154767.6, dated Feb. 21, 2022, 5 pages.

* cited by examiner

800

```
┌─────────────────────────────────────────────────────────────────────┐
│   COUPLING A FIRST DEVICE TO MEMORY WITH A FIRST INPUT-OUTPUT MEMORY │
│                      MANAGEMENT CIRCUIT 802                          │
└─────────────────────────────────────────────────────────────────────┘
                                    ↓
┌─────────────────────────────────────────────────────────────────────┐
│   COUPLING A SECOND DEVICE TO THE MEMORY WITH A SECOND INPUT-OUTPUT  │
│                   MEMORY MANAGEMENT CIRCUIT 804                      │
└─────────────────────────────────────────────────────────────────────┘
                                    ↓
┌─────────────────────────────────────────────────────────────────────┐
│   ASSIGNING A FIRST UNIQUE IDENTIFICATION VALUE FOR THE FIRST INPUT-OUTPUT │
│  MEMORY MANAGEMENT CIRCUIT BY A PROCESSOR IN SECURE ARBITRATION MODE 806  │
└─────────────────────────────────────────────────────────────────────┘
                                    ↓
┌─────────────────────────────────────────────────────────────────────┐
│   ASSIGNING A SECOND UNIQUE IDENTIFICATION VALUE FOR THE SECOND INPUT-│
│   OUTPUT MEMORY MANAGEMENT CIRCUIT BY THE PROCESSOR IN THE SECURE    │
│                      ARBITRATION MODE 808                            │
└─────────────────────────────────────────────────────────────────────┘
                                    ↓
┌─────────────────────────────────────────────────────────────────────┐
│   SENDING THE FIRST UNIQUE IDENTIFICATION VALUE TO THE FIRST DEVICE DURING A │
│  SECURE ASSIGNMENT OF THE FIRST DEVICE TO A FIRST TRUSTED DOMAIN OF THE │
│     MEMORY BY THE PROCESSOR IN THE SECURE ARBITRATION MODE 810       │
└─────────────────────────────────────────────────────────────────────┘
                                    ↓
┌─────────────────────────────────────────────────────────────────────┐
│    SENDING THE SECOND UNIQUE IDENTIFICATION VALUE TO THE SECOND DEVICE │
│   DURING A SECURE ASSIGNMENT OF THE SECOND DEVICE TO A SECOND TRUSTED │
│  DOMAIN OF THE MEMORY BY THE PROCESSOR IN THE SECURE ARBITRATION MODE 812 │
└─────────────────────────────────────────────────────────────────────┘
```

FIG. 8

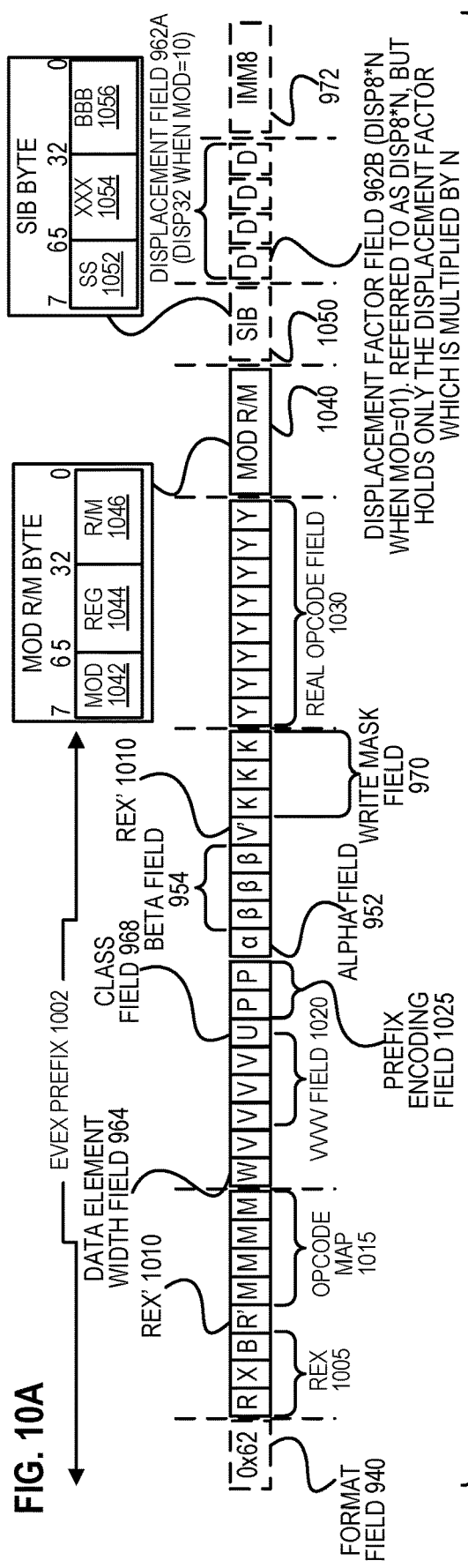
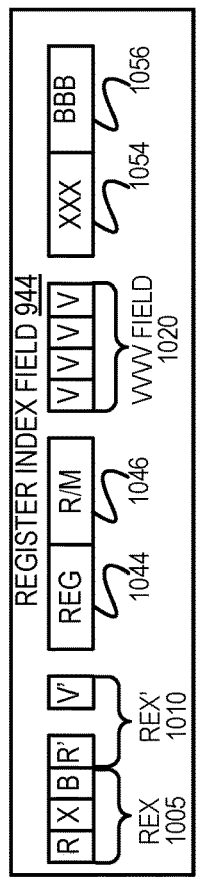
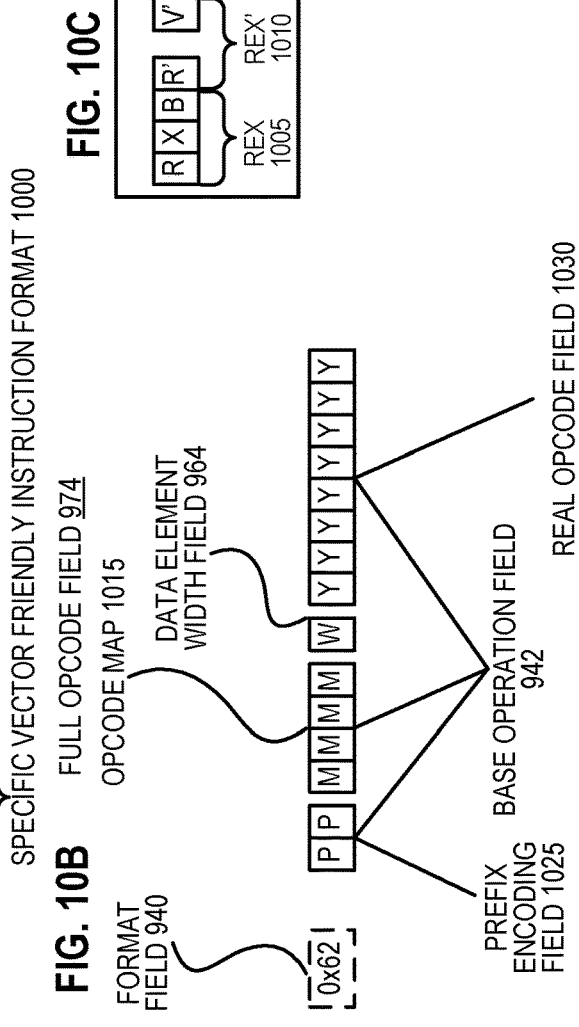

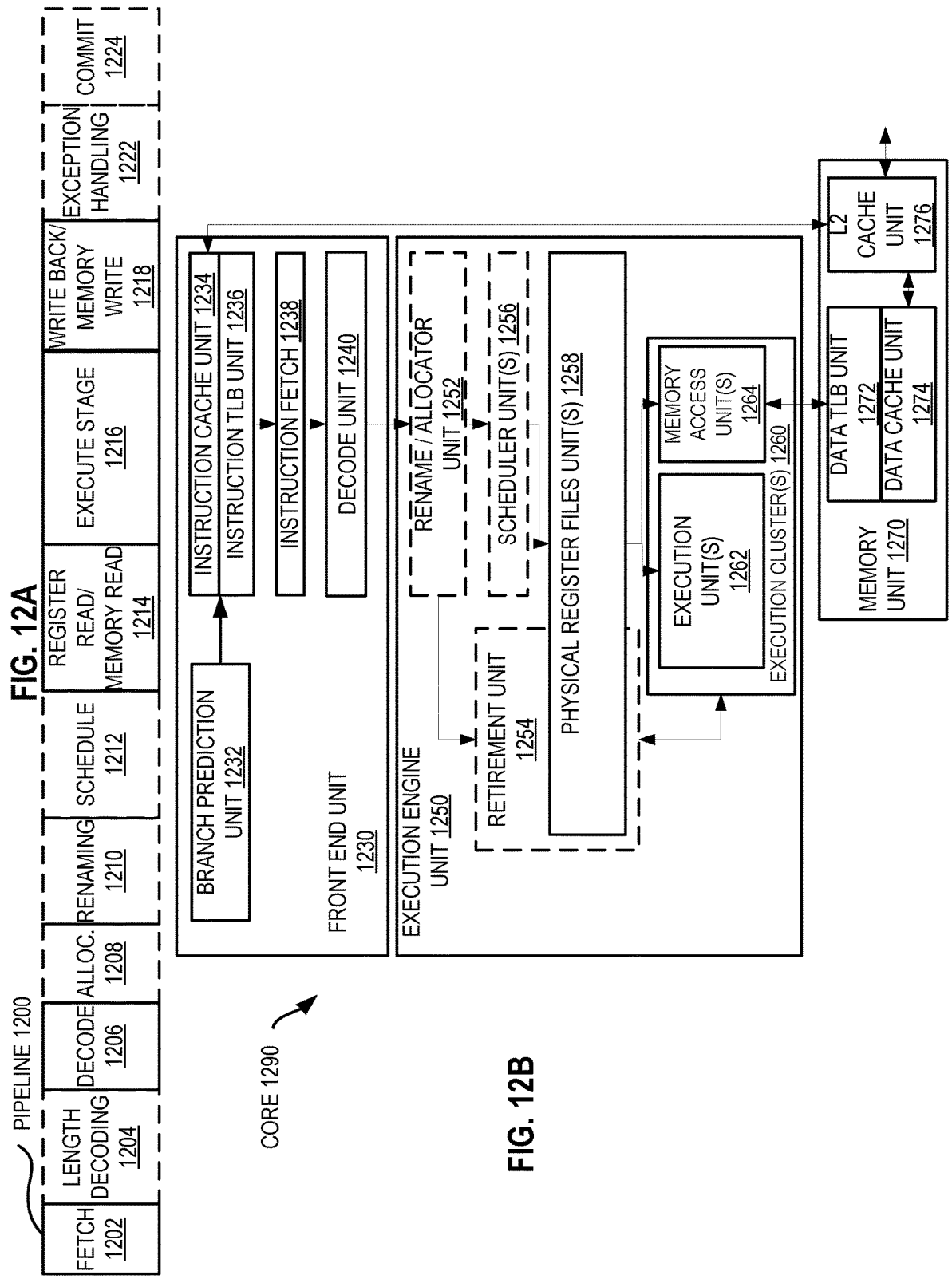

APPARATUSES, METHODS, AND SYSTEMS FOR VERIFICATION OF INPUT-OUTPUT MEMORY MANAGEMENT UNIT TO DEVICE ATTACHMENT

TECHNICAL FIELD

The disclosure relates generally to electronics, and, more specifically, an embodiment of the disclosure relates to a trusted mechanism for verification of input-output memory management unit to device attachment.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decode circuit decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 8 illustrates a flow diagram according to embodiments of the disclosure.

FIG. 10A is a block diagram illustrating fields for the generic vector friendly instruction formats in FIGS. 9A and 9B according to embodiments of the disclosure.

FIG. 10B is a block diagram illustrating the fields of the specific vector friendly instruction format in FIG. 10A that make up a full opcode field according to one embodiment of the disclosure.

FIG. 10C is a block diagram illustrating the fields of the specific vector friendly instruction format in FIG. 10A that make up a register index field according to one embodiment of the disclosure.

FIG. 12A is a block diagram illustrating both an exemplary in-order pipeline and an exemplary register renaming, out-of-order issue/execution pipeline according to embodiments of the disclosure.

FIG. 12B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In embodiments of computing, a virtual machine (VM) is an emulation of a computer system. In certain embodiments, VMs are based on a specific computer architecture and provide the functionality of an underlying physical computer system. Their implementations may involve specialized hardware, firmware, software, or a combination. In certain embodiments, a Virtual Machine Monitor (VMM) (also known as a hypervisor) is a software program that, when executed, enables the creation, management, and governance of VM instances and manages the operation of a virtualized environment on top of a physical host machine. A VMM is the primary software behind virtualization environments and implementations in certain embodiments. When installed over a host machine (e.g., processor) in certain embodiments, a VMM facilitates the creation of VMs, e.g., each with separate operating systems (OS) and applications. The VMM may manage the backend operation of these VMs by allocating the necessary computing, memory, storage and other input/output (I/O) resources, such as, but not limited to, an input-output memory management unit (IOMMU). The VMM may provide a centralized interface for managing the entire operation, status and availability of VMs that are installed over a single host machine or spread across different and interconnected hosts.

To achieve confidential and/or protected VM execution, the memory and the runtime processor state of the host machine must also be protected in certain embodiments. However, it may not be sufficient to only maintain the confidentiality (and integrity) of just the memory assigned to a VM, but it may also be desired to prevent (e.g., a malicious or exploited VM or VMM) from allowing a rogue (e.g., malicious or exploited) device to access (e.g., be attached to) private memory (e.g., a proper subset of memory for a trusted domain (TD)).

Figure 1:
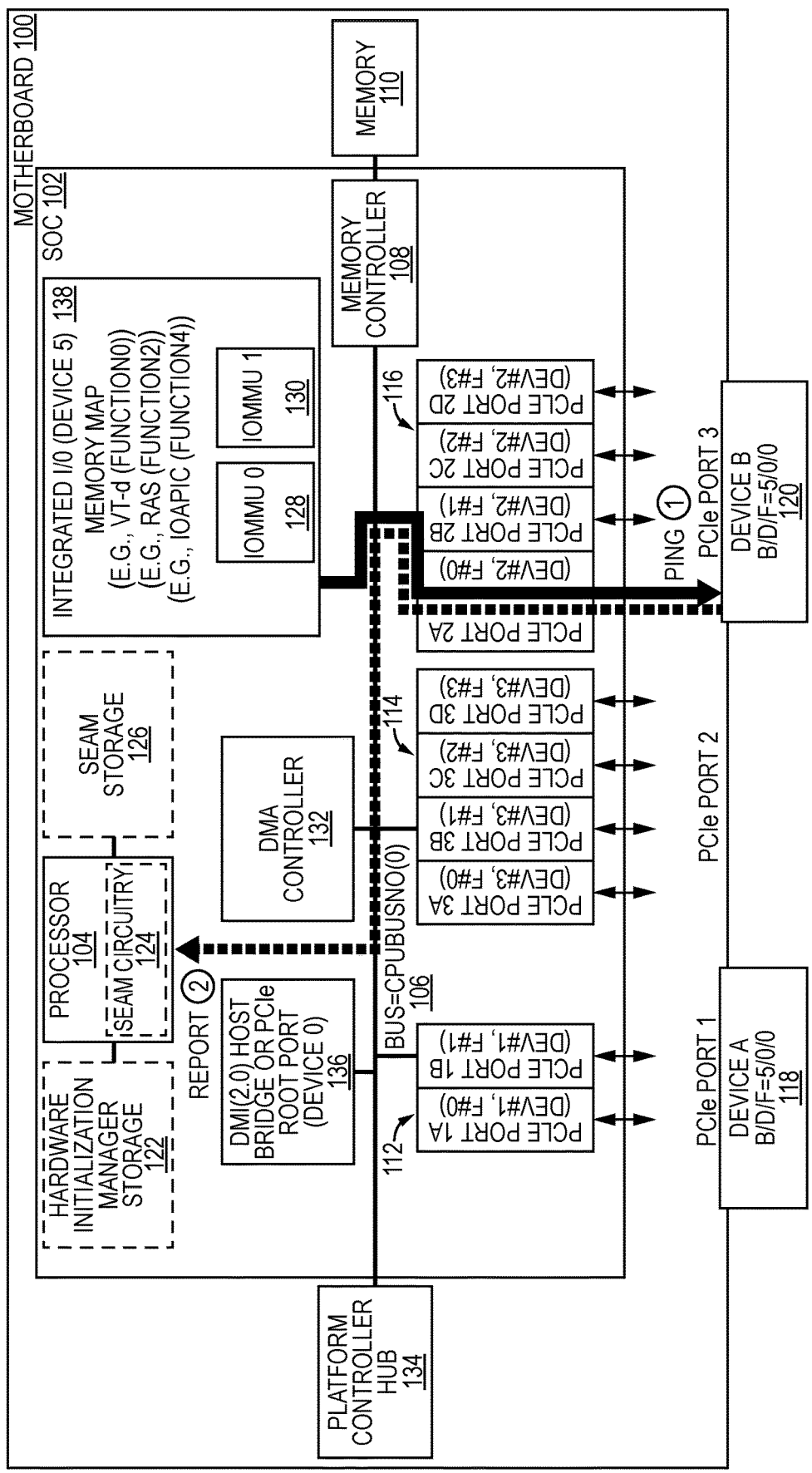
FIG. 1 illustrates a system on a chip (SoC) coupled to a motherboard according to embodiments of the disclosure.

FIG. 1 illustrates a system on a chip (SoC) 102 coupled to a motherboard 100 according to embodiments of the disclosure. Depicted SoC 102 includes a processor 104 coupled (e.g., via bus 106) to various components. In FIG. 1, the components include a memory controller 108 coupled to a memory 110. Memory 110 may be located on the motherboard 100, e.g., as dynamic random-access memory (DRAM), or storage class memory (SCM)-based memory, such as Non-Volatile Dual In-line Memory Module (NV-DIMM). Memory controller 108 may control access to the memory 110, e.g., separate memory from any cache memory of the processor 104. SoC 102 may include one or more ports to couple to a device or devices, e.g., device or devices separate from the SoC 102. Depicted components include a first segment 112, a second segment 114, and a segment 116 of ports. A port may couple to a device that is to connect to another component connected to the port, e.g., connected via bus 106. The interface between a device and another component (e.g., memory 110) may be according to a communication standard. An example high-speed serial computer expansion bus standard is the Peripheral Component Interconnect Express standard (abbreviated as PCIe or PCI-e), e.g., PCIe Revision 4.0 specification released on Oct. 5, 2017 or any future PCI Revision (e.g., 5.0, etc.).

In certain embodiments, a device (e.g., on a PCIe link) (e.g., one or more of the following devices: Universal Serial Bus (USB) controller, network controller, non-volatile memory (e.g., NVM express (NVMe)) controller, or graphics controller) is identified by a requester identification (RID) value. In one embodiment, the RID is a 16-bit identifier that includes a bus indication number (e.g., 8-bits), a device indication number (e.g., 5-bits), and a function indication number (e.g., 3-bit). The RID in certain embodiments is carried in the PCIe transaction header of read and/or write (e.g., direct memory access (DMA)) requests generated by the device.

In certain embodiments, an input/output memory management unit (IOMMU) (e.g., an input/output memory management circuit) is used to manage (e.g., contain) direct memory accesses from (e.g., PCIe) devices to memory regions accessible to those devices. When a (e.g., PCIe) device is directly assigned to a virtual machine, the device is programmed by the virtual machine with guest physical addresses (GPA) in certain embodiment. The virtual machine manager then programs a DMA remapping table (e.g., in memory) that translates the GPA to a physical address (PA) of the memory (e.g., memory 110) in certain embodiments. In order to locate the translation tables (e.g., in memory 110) to perform the DMA address remap and/or to restrict DMA from devices to only allowed physical addresses, the IOMMU uses the RID carried in the transaction header to determine the translation tables to perform the GPA to PA translation in certain embodiments.

An SOC may support one or more root complexes. Each root complex may be associated with one or more IOMMU. In order to expand the numbering space available to identify (e.g., PCIe) devices, system software may partition the devices attached to an SOC into multiple segments such that the RID is unique within a given segment (e.g., unique within each segment marked as 112, but not unique compared to the segments marked as 114 or 116). This partitioning may be done by the Basic Input/Output System (BIOS) (e.g., execution of the BIOS firmware stored in hardware initialization manager storage 122) and conveyed to the operating system (OS) and/or virtual machine monitor (VMM) through a data structures (e.g., such as a Unified Extensible Firmware Interface (UEFI) direct memory access reporting (DMAR) table).

Unlike the RID which is a number assigned to a (e.g., PCIe) device and carried with the transactions, the segment number is not carried in the wire protocol. Thus, the IOMMU nor the device know which segment they have been partitioned into, e.g., by the OS. In certain embodiments, this is not an issue since each segment is disjoint and even if there are devices in one or more PCIe segments with identical RID, the IOMMU associated with a segment only needs to do translation for the devices that are directly reached through the root complex that it is attached to.

However, in other embodiments, a processor (e.g., CPU) removes the VMM (e.g., hypervisor) from the trusted computing base (TCB) for virtual machines they manage. Example use cases are for a cloud service provider (CSP) that hosts many tenant VM workloads. From the perspective of both, the cloud service provider (CSP) and the cloud tenant, both parties likely desire confidentiality for the VM workload. To achieve this confidential VM execution, the memory and the runtime processor (e.g., CPU) state must be kept confidential and integrity-protected to prevent data exfiltration or tamper attacks in certain embodiments.

However, a processor (e.g., CPU) may include additional security capability (e.g., called Trust Domain Extensions (TDX)) to meet these security objectives via the use of memory encryption and integrity via the memory controller engines (e.g., multiple key-total memory encryption (MK-TME) engine).

In certain embodiments, the TDX architecture does not allow for DMA to private memory of a trusted domain (TD)

(e.g., a protected VM). In one embodiment, TD Private memory is encrypted and integrity-protected using at least one TD ephemeral key that is not accessible to the (e.g., untrusted) VMM. In one embodiment, the DMA from devices are done to unprotected memory (also called shared memory, which may or may not be encrypted and integrity-protected memory pages) and the TD software hence is to copy the data between TD shared memory and TD private memory. These additional required copies introduce significant overhead on software and may only be suitable where the data that needs to be DMA'ed is previously encrypted or integrity-protected (e.g., using software-managed keys), e.g., in the case of network traffic or storage. In one embodiment, this scheme of bouncing the data through shared buffers does not support shared virtual memory (SVM) usages since devices cannot access the shared (e.g., first level or IA) page tables in TD private memory, and does not support accelerator offload models where (e.g., cleartext) data from the TD private memory needs to be operated upon by the accelerator.

To address these limitations, certain embodiments herein include architectural extensions to the IOMMU to support direct DMA to TD private memory, such as an IOMMU having two sets of data structures: one that is setup by the VMM for access control for all devices and a second set of data structures for access control for trusted DMA requests to TD private pages from trusted devices assigned to trust domains. In one embodiment, the IOMMU enforces that when a walk is performed for untrusted devices through the data structures established by the VMM then neither those data structures nor the final physical address obtained as a result of walking those data structures can have a TD private key ID. This second data structure may be managed by a trusted intermediary, for example, a secure arbitration mode (SEAM) module (for example, executing from SEAM code stored in SEAM storage 126) and/or SEAM circuitry (e.g., circuitry 124 in FIG. 1). In one embodiment, SEAM firmware is stored in SEAM storage 126. The execution of SEAM code (e.g., as a trusted software module) may cause the SEAM module to act as trust broker between the TD and VMM. A processor may include functions (e.g., instructions) that are implemented in the SEAM module to configure the IOMMU data structures used to perform DMA remapping for trusted devices.

In one embodiment, a VMM obtains attestation reports from trusted devices and hands them to the TD. This attestation report includes the RID of the device, e.g., along with other information like the device version, etc. that the TD needs to verify the devices identity. In certain embodiments, the TD verifies these attestation reports and if it accepts the device as trust worthy, the TD requests the SEAM module to configure the trusted device contexts in the IOMMU such that this device can now perform DMA to the TDs private memory.

However, in certain embodiments, the RID is only unique within a single (e.g., PCIe) segment and as described above, a platform may be configured with one or more segments (e.g., 112, 114, and 116 in FIG. 1) and each segment may be associated with one or more IOMMUs (e.g., IOMMU0 128 and IOMMU1 130 in FIG. 1). Since this segment number is a software construct in this embodiment, the SEAM module has no trusted mechanism to determine which IOMMU should be programmed when the TD requests the trusted device contexts in the IOMMU to be programmed. In one TDX use model, the VMM is assumed to be malicious and such a malicious VMM may thus play tricks like obtaining attestations from a bonafide device attached to one (e.g., PCIe) segment and then reporting to the TD and SEAM module that the device is attached to a second (e.g., PCIe) segment than where it is physically attached. Such a VMM may then attach a rogue device to this second segment and configure it to have an identical RID as the first device. If the SEAM module does nothing else, then it will be tricked into acting as a confused deputy and thereby allowing this rogue device to DMA to the TD private memory in this embodiment. For example, in FIG. 1, device A 118 in segment 112 includes a RID having a bus indication number (B) of five, a device indication number (D) of zero, and a function indication number (F) of zero and device B 120 in segment 116 also includes an identical RID having a bus indication number (B) of five, a device indication number (D) of zero, and a function indication number (F) of zero.

To solve these problems, embodiments herein include a (e.g., PCIe) protocol and/or IOMMU extensions that are used by the SEAM module (or SEAM circuitry) to determine the IOMMU that is attached to the device requested to be mapped to a TD.

Certain embodiments herein utilize one or more of the following to identify the IOMMU attached to a device: (i) a mechanism to assign a unique ID (e.g., separate from the RID) to each IOMMU being used (e.g., in a platform) where this unique ID is configured (e.g., assigned) only by a trusted intermediary (e.g., the SEAM module and/or SEAM circuitry), (ii) a (e.g., PCIe) communication protocol extension to generate a special trusted transaction (e.g., a trusted ping) that is routed by the RID and carries this unique ID (e.g., value) of the IOMMU (e.g., where the OS is not trusted), or (iii) a trusted input/output (I/O) protocol where the device when requested to provide its attestations generates a report that includes the unique ID it received in the trusted ping. Any (or all) of these improves the performance of a computer and solves the problems discussed above by allowing a trusted intermediary (e.g., the SEAM module) to uniquely identify the IOMMU that is attached to the device and thereby detect if the VMM tries to use it as a confused deputy to map rogue devices into a TD. Any (or all) of these allows the implementation of a TDX Trusted IO framework and defense against a critical threat posed by BIOS/VMM. In one embodiment, the ping packet carries a key or other encrypted data to the device.

In one embodiment, the attestation process provides assurance that the protected environment (e.g., TD) is correctly invoked and measures the integrity of software running in the protected environment. The information exchanged during this process, which may be referred to as the "attestation identity key credential," is used to establish mutual trust between parties (e.g., between an IOMMU and a TD).

As one example in reference to FIG. 1, SOC 102 has two IOMMUs, i.e., IOMMU0 128 and IOMMU1 130. In one embodiment, PCIe port 1 is connected to IOMMU0 128 and PCIe ports 2 and 3 are connected to IOMMU1 130 such that PCIe port 1 is configured as one PCIe segment and the PCIe ports 2 and 3 are configured as a different PCIe segment. Thus, in this embodiment, devices attached to port 1 can have overlapping requester IDs (e.g., b/d/f) with the devices connected to ports 2 or 3, for example, depicted device A and device B have same b/d/f=5/0/0. Certain embodiments herein allow for (e.g., SEAM module or SEAM circuitry) to assigned (e.g., program) a unique IOMMU ID (e.g., separately from the RID) for each of the IOMMUs. On request from the SEAM module (e.g., when it is desired to couple a device to the SOC 102 to allow access to the memory 110, e.g., via direct memory access (DMA) controller 132, the IOMMUs send their unique ID in a trusted ping (e.g., PCIe packet) to a respective device, for example, to detect if device B 120 is actually connected IOMMU1 130, a request is sent to IOMMU1 130 to send (e.g., via the SEAM module as indicated by the circle 1) the trusted ping packet to device B 120. In certain embodiments, device B 120 then saves the unique IOMMU ID received in the ping packet. In one embodiment, the device saves the unique IOMMU ID in its internal protected registers, for example, where the unique IOMMU ID cannot be tampered with by a VMM using the software interface or using hardware attacks (e.g., through debug interfaces of the device).

Subsequently when device B 120 is queried by the SEAM module, device B 120 reports the received unique IOMMU ID (e.g., from its storage). By checking this IOMMU ID reported by a device against the IOMMU ID that was originally sent to that device, the SEAM module can determine which IOMMU that device is connected to. In one embodiment, a SEAM module (or circuit) sends a same, first unique IOMMU ID value to all devices coupled to a corresponding first IOMMU and sends a same, second (different than the first) unique IOMMU ID value to all devices coupled to a corresponding second IOMMU.

In FIG. 1, motherboard 100 (or SoC 102) may include a platform controller hub (PCH) 134, e.g., PCH that includes system clock and/or PCI (or PCIe) controller, shown as coupled to bus 106. Further coupled to bus 106 are a direct media interface (DMI) (e.g., DMI2.0) Host Bridge or PCIe Root Port device 136. In one embodiment, device 136 generates transaction requests on behalf of a processor and/or monitors the bus (e.g., interconnect) hierarchy of the (e.g., PCI) ports by tracking the bus (e.g., interconnect) bandwidth and ensuring that the (e.g., PCI) port hierarchy is functioning properly. Integrated I/O device 138 may include a memory map and/or allow function calls, for example, Virtualization Technology for Directed I/O (VT-d or VTD) function call, RAS functional call, or IOAPIC function call.

In one embodiment, VT-d enables protection by restricting direct memory access (DMA) of the devices to pre-assigned domains (e.g., TDs) or physical memory regions. This may be achieved by a hardware capability known as DMA-remapping. The VT-d DMA-remapping hardware circuitry in the chipset may sit between the DMA capable peripheral I/O devices and the computer's physical memory. It is programmed by the computer system software in certain embodiments. In a virtualization environment, the system software may be the VMM. In a native environment where there is no virtualization software, the system software may be the native OS. In certain embodiments, DMA-remapping translates the address of the incoming DMA request to the correct physical memory address and perform checks for permissions to access that physical address, e.g., based on the information provided by the system software.

In certain embodiments, VT-d enables system software to create multiple DMA protection domains. Each protection domain (e.g., trusted domain) is an isolated environment containing a subset of the host physical memory. Depending on the software usage model, a DMA protection domain may represent memory allocated to a virtual machine (VM), or the DMA memory allocated by a guest-OS driver running in a VM or as part of the VMM itself. In certain embodiments, the VT-d architecture enables system software to assign one or more I/O devices to a protection domain. DMA isolation may be achieved by restricting access to a protection domain's physical memory from I/O devices not assigned to it by using address-translation tables. VT-d may thus provide the necessary isolation to assure separation between each virtual machine's computer resources. For example, when any given I/O device tries to gain access to a certain memory location, DMA remapping hardware looks up the address-translation tables for access permission of that device to that specific protection domain. If the device tries to access outside of the range it is permitted to access, the DMA remapping hardware blocks the access (e.g., and reports a fault to the system software) in certain embodiments.

In one embodiment, Reliability, Availability, and Serviceability (RAS) features allow a platform to recover from bad data consumption, detect bad (e.g., malicious) instruction(s), and retry transactions in attempt to recover.

In one embodiment, an I/O Advanced Programmable Interrupt Controller (IOAPIC) function call is used to distribute external interrupts to physical or logical (e.g., clusters of) processors and can be prioritized.

In one embodiment, the hardware initialization manager (non-transitory) storage 122 stores Basic Input/Output System (BIOS) firmware. In another embodiment, the hardware initialization manager (non-transitory) storage 122 stores Unified Extensible Firmware Interface (UEFI) firmware. In certain embodiments (e.g., triggered by the power-on or reboot of a processor), processor 104 executes the hardware initialization manager firmware (e.g., or software) stored in hardware initialization manager (non-transitory) storage 122 to initialize the processor for operation, for example, to begin executing an operating system (OS) and/or initialize and test the (e.g., hardware) components of SoC 102. This may begin execution of a SEAM module and/or circuitry.

Figure 2:
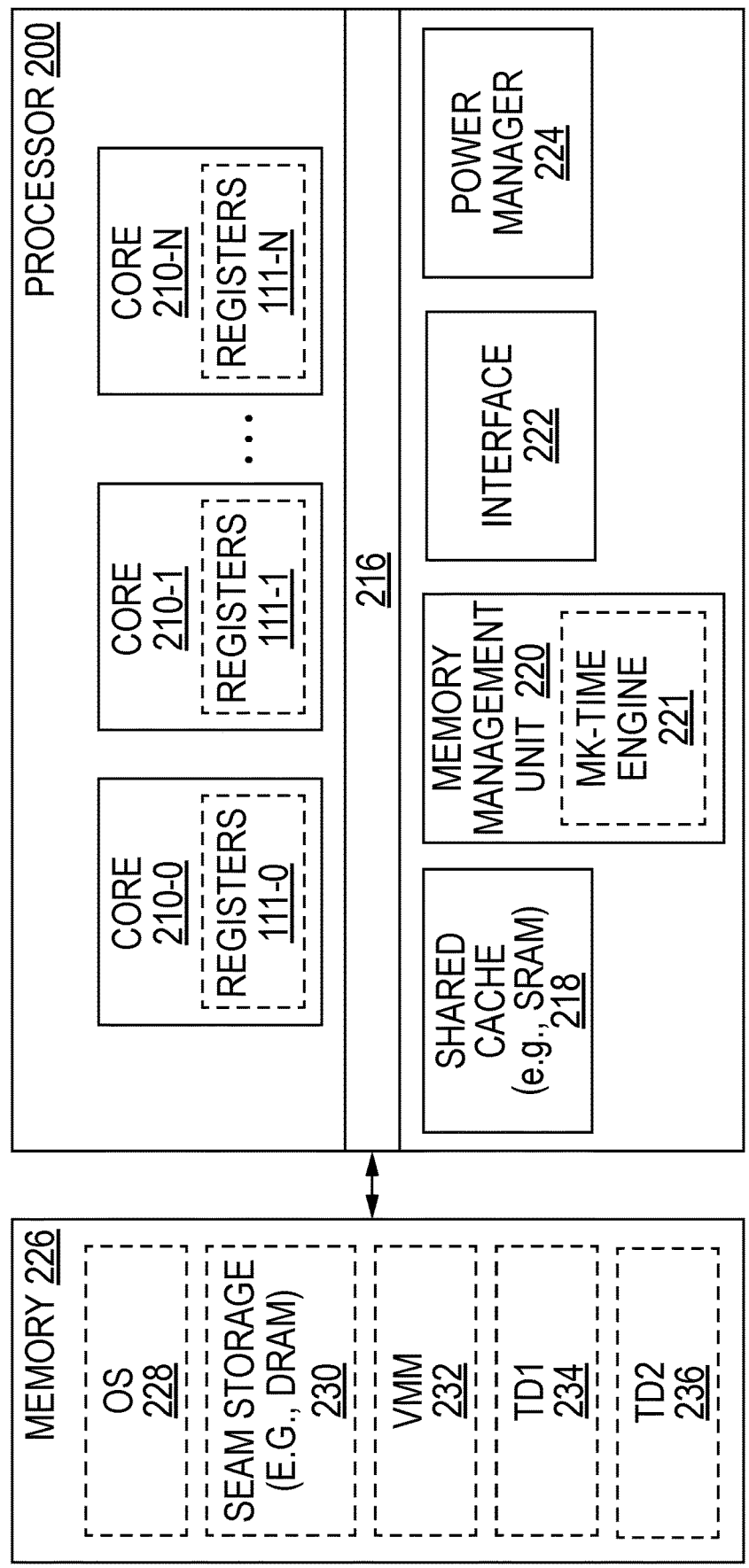
FIG. 2 illustrates a hardware processor coupled to memory according to embodiments of the disclosure.

FIG. 2 illustrates a hardware processor 200 coupled to memory 226 according to embodiments of the disclosure. Depicted processor 200 is coupled to memory 208 (e.g., dynamic random-access memory (DRAM)). In certain embodiments (e.g., triggered by the power-on or reboot of a processor), processor 200 begins executing a SEAM module (e.g., from optional SEAM storage 228), an operating system (OS) from OS storage, and/or initialize and test the (e.g., hardware) components of processor 200. Processor (e.g., one or more cores thereof) may execute a virtual machine monitor from VMM storage 232. Memory 226 may include one or more private memory sections, e.g., trusted domain Vs private memory 34 and trusted domain 2's private memory 236. Memory may include SEAM storage 230, e.g., to store SEAM code or SEAM firmware, that when executed, causes the actions herein (e.g., assigning of unique IOMMU IDs, sending a trusted ping, etc.)

Depicted processor 200 is a multicore processor including core circuitry 212 having a plurality of cores 210-0 to 210-N, where N is any integer, and respective registers sets 211-1 to 211-N. In another embodiment, processor only includes a single core. Cores 210-0 to 210-N may be coupled to each other via bus 216 or other electrical coupling. Each core may include the components discussed herein. Depicted processor 200 may include any combination of shared cache 218 (e.g., static random-access memory (SRAM)) (e.g., a last level cache from any core cache), memory management unit 220 (e.g., to maintain cache coherency in caches and/or fetch and retrieve data from memory 208 or other memory), interface 222 (e.g., to provide a coupling to various components that are not part of processor 200), such as, but not limited to, peripheral devices, mass storage, etc.). Memory management unit 220 (or other component discussed herein) may include a multiple key-total memory encryption (MK-TME) engine 221. In one embodiment, each TD is cryptographically isolated in memory using at least one exclusive encryption key of the MK-TME engine 221 for encrypting the memory (e.g., holding code and/or data) associated with the trusted (trust) domain (TD).

In one embodiment, power manager 224 (e.g., circuit) controls the power levels of the components of processor 200 (e.g., cores), e.g., according to a power state. In one embodiment, an operating system executing on processor 200 requests the power state changes that are implemented by power manager 224.

Figure 3:
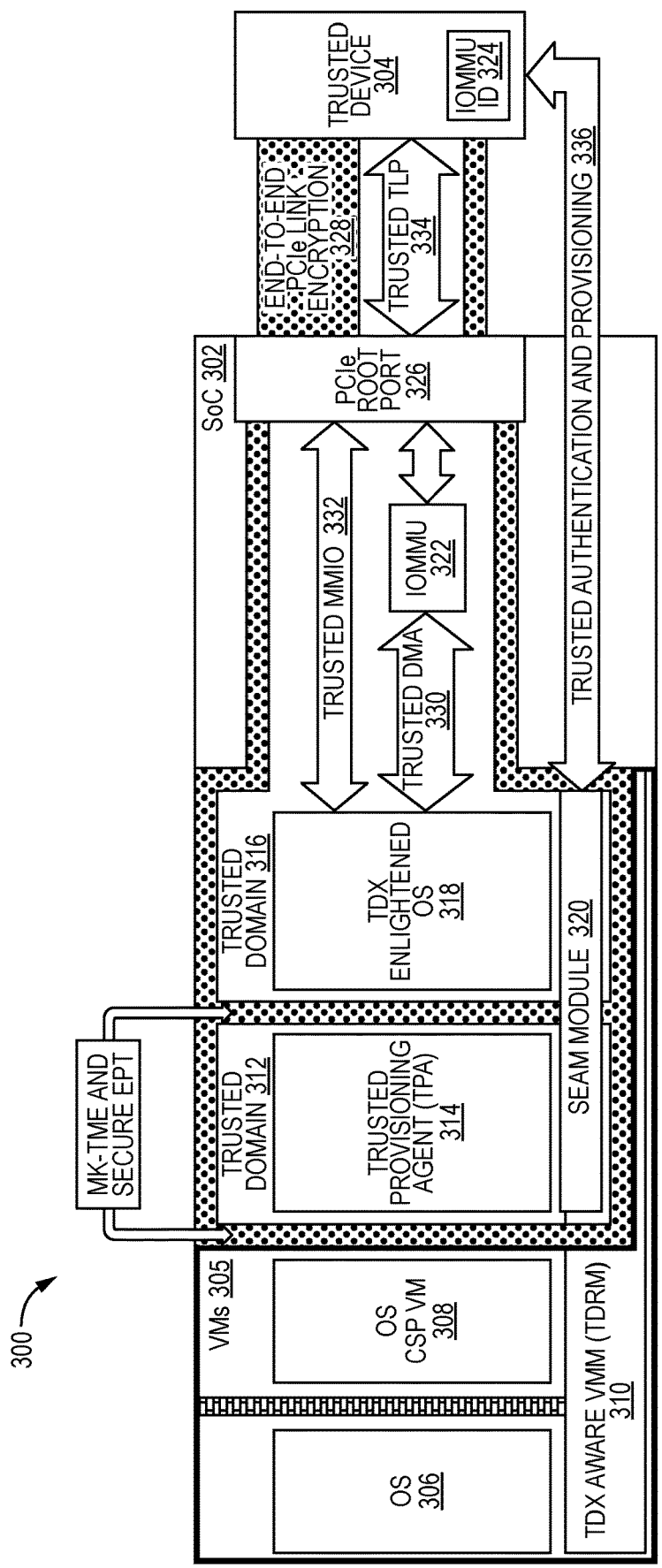
FIG. 3 illustrates a system on a chip (SoC) coupled to a trusted device according to embodiments of the disclosure.

FIG. 3 illustrates a system on a chip (SoC) 302 coupled to a trusted device 304. according to embodiments of the disclosure. In the depicted circuitry 300, SoC (e.g., a processor and other components of SoC executing code, include an operating system (OS) 306 (e.g., operating as a virtual machine outside of a trusted domain), a cloud service provider operating system (OS) (e.g., operating as a virtual machine), and virtual machines 305. Virtual machine monitor (VMM) may be a TDX (e.g., as discussed above) aware VMM 310, e.g., that creates, manages, and governs the VM instances and manages the operation of a virtualized environment on top of the SoC 302. Depicted SoC 302 includes a first trusted domain 312 that includes a trust provisioning agent (TPA) 314. TPA 314 may provision secrets (keys, etc.) and establish access controls to MMIO control and to TD private memory. In certain embodiments, for trusted memory-mapped input/output (MMIO) 322 (e.g., using the same address space to address both memory and I/O devices) and trusted DMA 330, confidentiality, integrity and replay-protection techniques are implemented as well as signaling of trusted transactions to/from the device and access-control enforcement. In the depicted embodiment, IOMMU 322 is to be coupled to trusted device 304 by request of the SEAM module 320, e.g., with the SEAM module 320 performing its actions by a request from TDX enlightened OS 318 that is within second trusted domain 316. Note that each domain may be encrypted using MK-TME and secure extended page table (EPT). In one embodiment, each domain has its own MK-TME key and/or its own secured EPT data structure. The data structures discussed herein may be saved in memory, e.g., memory 110 in FIG. 1 or memory 226 in FIG. 2. FIG. 3 further depicts an end-to-end (e.g., PCIe) link encryption 328, and a trusted transaction layer packet (TLP) 334 performing communication between trusted device 304 and SoC 302 (e.g., between trusted device 304 and IOMMU 322 within trusted domain 316 via PCIe Root Port 326).

In certain embodiments, each IOMMU (e.g., IOMMU 322 in FIG. 3) of a platform (e.g., Soc 302) is programmed (e.g., generated and a secure record kept) of a unique IOMMU identifier (e.g., IOMMU ID 324 in FIG. 3). The IOMMU identifier may be stored in a corresponding protected register (e.g., that is only accessible by SEAM module 320). In one embodiment, the unique IOMMU identifier (e.g., IOMMU ID 324 in FIG. 3) is stored in secure register space (e.g., TRUSTED_VTD register space 401 in FIG. 4) by a secure component (e.g. SEAM module 320 in TDX). In certain embodiments, during secure assignment (e.g., trusted authentication and provisioning 336 in FIG. 3) of an authenticated device (e.g., trusted device 304) to a TD (e.g., TD 316), its corresponding IOMMU (IOMMU 322) is instructed to send its unique identifier value down (e.g., at 336) to the device (e.g., device 304) (e.g., the device identified by the RID value (BDFx)) via a posted transaction (e.g. a "message with data" (MsgD) type of communication). Device (e.g., trusted device 304) then stores unique IOMMU identifier (e.g., IOMMU ID 324 in FIG. 3) in the device in certain embodiments.

Thus, in certain embodiments, the device (e.g., device 304) passes back the IOMMU identifier (e.g., IOMMU ID 324 in FIG. 3) as part of its posture report (e.g., along with trusted agent (TA) (e.g., trusted provisioning agent 314) supplied nonce, RID (e.g., B/D/F), link status, base address register (BAR) information, etc.) configured by the VMM into the device that is in the processes of being assigned to the TD (e.g., by the TDX IO trusted agent (e.g., trusted MMIO 332)) and consequently to TD (e.g., trusted domain 316) via secure channels. In certain embodiments, the TD passes the IOMMU identifier (e.g., from 324) to SEAM module (e.g., SEAM module 320) as part of a device bind request (e.g., binding via secure VTD context tables). From this IOMMU identifier, the SEAM module (e.g., SEAM module 320) determines (e.g., from trusted register space 401 in FIG. 4) which trusted root pointer to use to perform the device to IOMMU attach flows. In certain embodiments, each IOMMU has private register space (e.g., TRUSTED_VTD_BAR) which holds the pointer (e.g., the trusted root pointer) to its translation tables. In these embodiments, based on the IOMMU ID, a SEAM module may determine which private register space (e.g., TRUSTED_VTD_BAR) to use and thus the trusted root pointer. In certain embodiments, a SEAM module programs DMA access controls into the tables linked to the correct TRUSTED_VTD_BAR (e.g., having the correct trusted root pointer) based on that IOMMU ID.

Hence, with such a mechanism, across two PCIe segments with two devices (one authorized and another a hack) having the dame RID (e.g., same BDF), the unique IOMMU identifiers in device reports would prevent any confused deputy attack by VMM/Host OS in certain embodiments. Even with malicious VMM presenting an authorized device report as a proxy for the hack device, the IOMMU identifier would lead to SEAM module using the trusted root pointer corresponding to the IOMMU of the authorized device, which would prevent the hack device from having any DMA access to corresponding TD private memory via its IOMMU. Thus, VMM attempts of hack device to bind to TD (and thus access the TD's private memory) would fail. With this defense, in general, for a particular trusted device, any wrongdoing by BIOS/VMM in telling the wrong pairing of IOMMU and device, would result in that device not having the correct (unique) IOMMU identifier in its report back and thereby rejection by TD/SEAM module before device binding.

In certain embodiments, the IOMMU identifiers are not secret as they are passed in the device reports back to the trusted agents/trusted domains through VMM. So, in these embodiments, the VMM can read the IOMMU identifier value. However, in certain embodiments, this new "message with data" (MsgD" type posted transaction (e.g., like ATS protocol messages) can only originate from the attached IOMMU on the hardware platform, e.g., a device will receive only the trusted ping from its corresponding IOMMU via a dedicated PCIe transaction. In one embodiment of TDX Trusted IO architecture, the programming of the unique identifier for an IOMMU is access controlled to only the SEAM module, for example, such that BIOS/VMM cannot lead to an authorized device receiving and reporting back the wrong IOMMU identifier. This trusted ping from IOMMU to the device can be extended to include more forms of secure communication depending on trusted IO architecture requirements.

In one embodiment, a hack (e.g., unauthorized) device colluded with VMM/BIOS in TDX trusted I/O architecture and accepts and reports a different IOMMU identifier, but the binding is rejected by the TD at the authentication phase (e.g., via the device certificate for the back device not matching the device certificate to the authorized device corresponding to the "different" (e.g., spoofed) IOMMU identifier value). Hence the disclosure herein provides secure verification of device attachment to corresponding IOMMU in the TDX trust model.

Trusted Register Map

Figure 4:
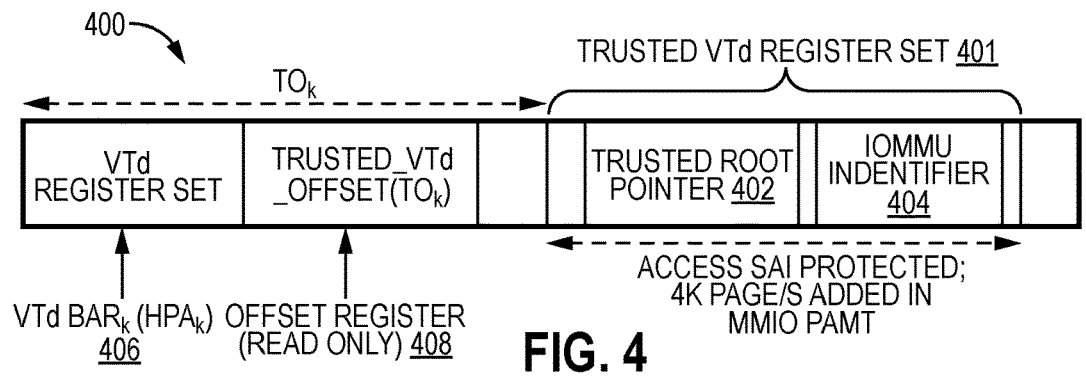
FIG. 4 illustrates trusted register address space storing a unique identification value for an input-output memory management unit (IOMMU) according to embodiments of the disclosure.

FIG. 4 illustrates trusted register address space 401 storing a unique identification value 404 for an input-output memory management unit (IOMMU) according to embodiments of the disclosure. Trusted register address space 401 may also include storage for trusted root pointer 402.

VT-d (VTD) register address space 400 includes a base address register 406, e.g., used by VMM to access an IOMMU's register space. In one embodiment, TDX trusted I/O architecture uses (e.g., requires) trusted VTD space 401 in the memory map per IOMMU, e.g., used in guarding access security to critical registers. For example, trusted register address space 401 may store trusted root pointer 402, Trusted Invalidation Queue Pointers, or the unique IOMMU identifier 404, among others. In one embodiment of a TDX trust model, these registers are to be protected from VMM access and only be accessible to the SEAM module (e.g., CPU in SEAM VMX root mode).

To avoid the creation of new, separate Trusted VTDBAR per IOMMU and associated decode circuitry in the SoC fabric, in one embodiment, the trusted register space 401 would be part/extension of a VTD base address register (BAR) 406 of VTD registers 400, e.g., but with additional access controls as mentioned above. In this scheme, there would be a new offset register 408 (e.g., read access only by the SEAM module) in VTDBAR 406, which would advertise the offset of the base of Trusted VTD register space (from VTDBAR base) and corresponding size (e.g., if >4K bytes of storage size is desired). In certain embodiments, for every VTD generation, the offset value stored in offset register 408 is adjusted to take into account increased sizes of VTDBAR, new IOMMU capabilities, new trusted VTD register space requirements, etc. In certain embodiments, the IOMMU registers (e.g., register 402 storing the Trusted Root Pointer and the register 404 storing a unique IOMMU identifier) are accessible at standard offsets from the base 406 of the corresponding Trusted VTD register space.

In certain embodiments, the IOMMU registers in the trusted VTd register space are access controlled. In one of these embodiments, the IOMMU registers are readable by all software components but writeable only by a SEAM module. In another embodiment, the IOMMU register are all be readable (e.g., and writable) only by the SEAM module. A mix of these two is possible where some registers in trusted VTd register space are readable by all components and some registers are readable only by a SEAM module (e.g., ones that contain data to be maintained secret), for example, where all registers that are writeable are only be writeable by a SEAM module.

Along with virtualization requirements of preventing any VM (e.g., TD) access to such registers, Trusted VTD register space may need to be protected from VMM access too. In certain embodiments, this is achieved through Security Attribute of Initiator (SAI) based access control on all registers in the Trusted VTD space. One possibility is a unique SAI for SEAM mode or SEAM accesses to UC/WC memory (MMIO) and the IOMMU trusted VTd registers having this SEAM SAI based policy control. For efficiency, this could also be repurposing the same SAI that is associated with the TDX non-root mode for certain (e.g., uncacheable (UC) and/or write combining (WC)) accesses, proposed for general MMIO access control in TDX trusted IO architecture. For this option, in addition, to limiting to only SEAM accesses, the Trusted VTD register address space of all IOMMUs on a platform are mapped to SEAM's page tables (e.g., IA) and the corresponding MMIO Page Attribute Metadata Table (PAMT) entry/ies are marked off as "allocated" in certain embodiments. In the corresponding MMIO PAMT entries, the VTDBAR (e.g., host physical address (HPA)) of the corresponding IOMMU (or unique identifier) and owner (e.g., SEAM module) can be inserted as part of the process. Hence these MMIO pages are locked/reserved and cannot be allocated any further as part of adding a secure EPT (e.g., via execution of an ADDSEPT instruction) for MMIO mapping to TDs in certain embodiments.

In certain embodiments, a trusted VTD BAR includes further security requirements. For example, as BIOS configures the VTDBARs for all IOMMUs in platform and it is out of the TCB of secure VMs (e.g., TD) in the TDX trust model, the following verifications are to be performed (e.g., by machine check (MCHECK) firmware at the post boot stage in certain embodiments. In one embodiment, these requirements include the following:

1) After the boot stage, the VTDBAR settings should be invariant, i.e. not changeable by any other software entity. This "locking" of the VTDBAR on platform (over a boot cycle) can be achieved by restricting the VTDBAR to be programmable only by SAI equal to BOOT BIOS SAI. In this case, post BOOT BIOS stage, the VTDBAR configuration cannot be changed.

2) MCHECK verifies the VTDBARs corresponding to all IOMMU on platform have been locked or are invariant for the boot cycle. In the above mentioned scenario of restricting VTDBAR programmability to BOOT BIOS SAI, this requires MCHECK to verify that all logical processors on all packages of platform are in post BOOT BIOS mode.

3) To prevent any address aliasing with memory (e.g., DRAM) ranges and between each other, MCHECK reads VTDBARs and verifies that they decode only to platform MMIO range as well as there being no overlap in the VTDBAR ranges on the platform.

4) Finally, to prevent attacks by BIOS/VMM in certain scenarios (e.g., falsifying VTDBAR information to SEAM; as discussed below), MCHECK, after the abovementioned VTDBAR verification, configures a trusted table of VTD-BARs of all IOMMUs in platform at fixed address in a SEAM range register (SEAMRR), e.g., in registers depicted herein. In one embodiment, a SEAM module executes from within a reserved region of memory which is protected using a range register (e.g., SEAMRR) such that this memory cannot be read or written by any software outside the SEAM module or any devices.

In certain embodiments, SEAM module uses this root of trust (e.g., trusted configuration) to perform steps pertaining to the proposed trusted ping for TDX 10, and thus the SEAM module cannot be tricked with false information regarding IOMMU BARs, e.g., from BIOS provided UEFI DMAR tables or VMM. Embodiments of these steps are also shown in FIG. 5.

Programming of Unique IOMMU Identifier

Figure 5:
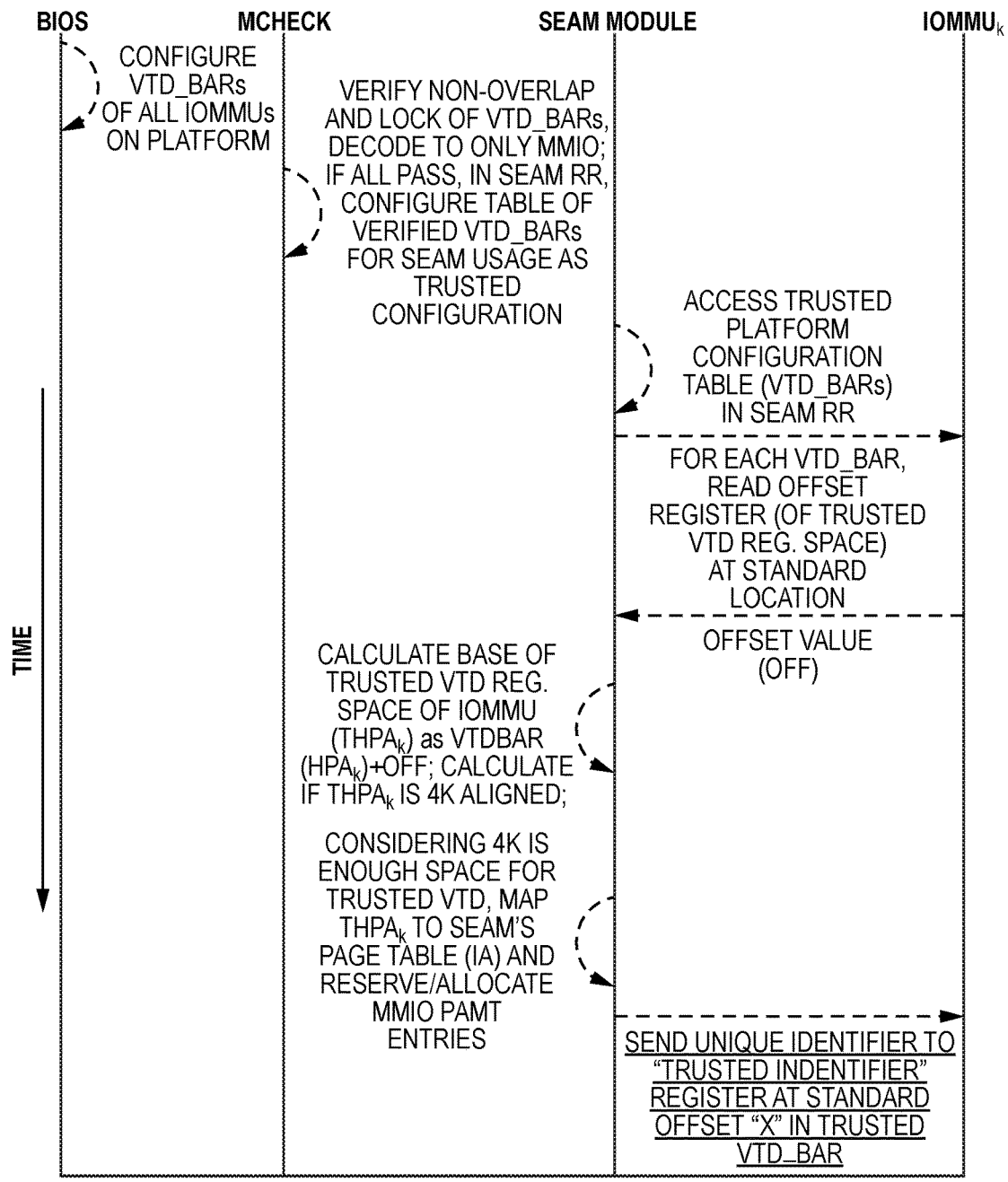
FIG. 5 illustrates programming a unique identifier to each input-output memory management unit (IOMMU) on a platform according to embodiments of the disclosure.

FIG. 5 illustrates programming a unique identifier to each input-output memory management unit (IOMMU) on a platform according to embodiments of the disclosure. As shown via underlined text, the unique IOMMU identifier is stored in a protected register (e.g., in 404 in FIG. 4).

As shown in FIG. 5, in one embodiment: BIOS provides the DMAR tables of all IOMMUs in platform to the VMM. For each IOMMU, the DMAR (e.g., associated DMA Remapping Hardware Unit Definition (DRHD) table includes a VTDBAR address, the PCIe segment it belongs to, as well as device scope, etc. Using the VTDBAR information for each IOMMU, the VMM may programs the IOMMU registers such as Root Table Pointer (e.g., using PCIe segment information), fault, I/O translation lookaside buffer (IOTLB) related registers, invalidation queue pointers, etc. In an embodiment of a TDX trust model according to this disclosure, the VTDBAR registers are configured by the VMM, however, the security critical trusted VTD registers (e.g., 401 in FIG. 4) of each IOMMU are only programmable by SEAM module. To obtain the VTDBAR info for every IOMMU (for example, from which Trusted VTDBAR would be determined, e.g., by an offset), in certain embodiments the SEAM module relies on the trusted configuration table programmed in SEAMRR by MCHECK at the post BOOT BIOS stage. This table includes a list of MCHECK verified VTDBARs on the platform in certain embodiments.

Next, e.g., as seen in FIG. 5, for an IOMMU, the SEAM module reads the Offset register (for example, a value of "V1") for calculating the base of the trusted VTD register space (e.g., 401 in FIG. 4) in VTDBAR. In certain embodiments, this is a standard, new register defined in VTDBAR. The SEAM module calculates the base of the trusted VTD register space (e.g., trusted host physical address (THPA)) as THPA=host physical address (HPA)+V1. Consequently, before mapping into own page tables, the SEAM module verifies the page (e.g., 4K Byte) alignment of THPA. Although one page (e.g., 4 KB) of memory may be enough storage space for trusted VTD registers in the TDX trusted IO architecture, future requirements of greater than one page can be expressed, e.g., either through the offset register (e.g., upper bits mentioning on number of pages and lower bits depicting base of trusted space) or an additional register in VTDBAR as applicable. After page alignment verification, in order to prevent this MMIO system address map (e.g., of trusted VTDBAR) to be allocated any further for device memory assignment, other platform registers, etc., the SEAM module maps the THPA in its own (e.g., IA) page tables. It may also mark the corresponding entry/ies in the MMIO Page Table tracker (PAMT) as allocated/used. In one embodiment, the VTDBAR ranges (e.g., including trusted VTDBAR) is excluded from the MMIO PAMT at time of PAMT configuration. In certain embodiments, the SEAM SAI based access control prevents any VMM or devices from accessing trusted VTD register space, and the above mentioned allocated or reserved MMIO PAMT entries/VTD ranges would prevent any MMIO mapping to TD's private memory through secure EPT. Consequently, during the trusted IOMMU configuration stage (e.g., along with the trusted root pointer base address), SEAM programs a unique IOMMU identifier to a (e.g., fixed standard) register (e.g., 404 in FIG. 4) in trusted VTD register space (e.g., 401 in FIG. 4) of the IOMMU. In one embodiment, this identifier is a random number. In another embodiments, this identifier is or unique counter value. In one embodiment, a SEAM library maintains IOMMU (e.g., VTDBAR or trusted root pointer) to unique identifier mapping in its internal memory (e.g., separate from the trusted VTD register space). At the end of this stage, each IOMMU will have a unique identifier in register (e.g., register 400) at offset X in its trusted register map in certain embodiments. The IOMMU then may use this value for a trusted ping to a (e.g., trusted) device at trusted device assignment time.

In an embodiment with one SAI shared between SEAM module and TD non-root, the trusted table of verified VTDBARs configured by MCHECK in SEAMRR prevents any attack through BIOS/VMM spoofing or falsifying the VTDBARs and misdirecting SEAM to map different MMIO regions in its own page tables. In another embodiment, if SEAM module has a unique SAI (e.g., used in access control to UC/WC memory accesses), then that would render any attacks by BIOS/VMM futile. In certain embodiments, this would not require MCHECK configuration of the trusted VTDBARs on the platform because even with falsifying information, the actual trusted VTDBAR memory space would be inaccessible to all software entities apart from SEAM. So VMM, BIOS, TD cannot collude to maliciously use the trusted VTDBAR in these embodiments. The actual trusted ping operation flows and device report verification is described in the next section.

Trusted Ping Operation at Secure Device Assignment

Figure 6:
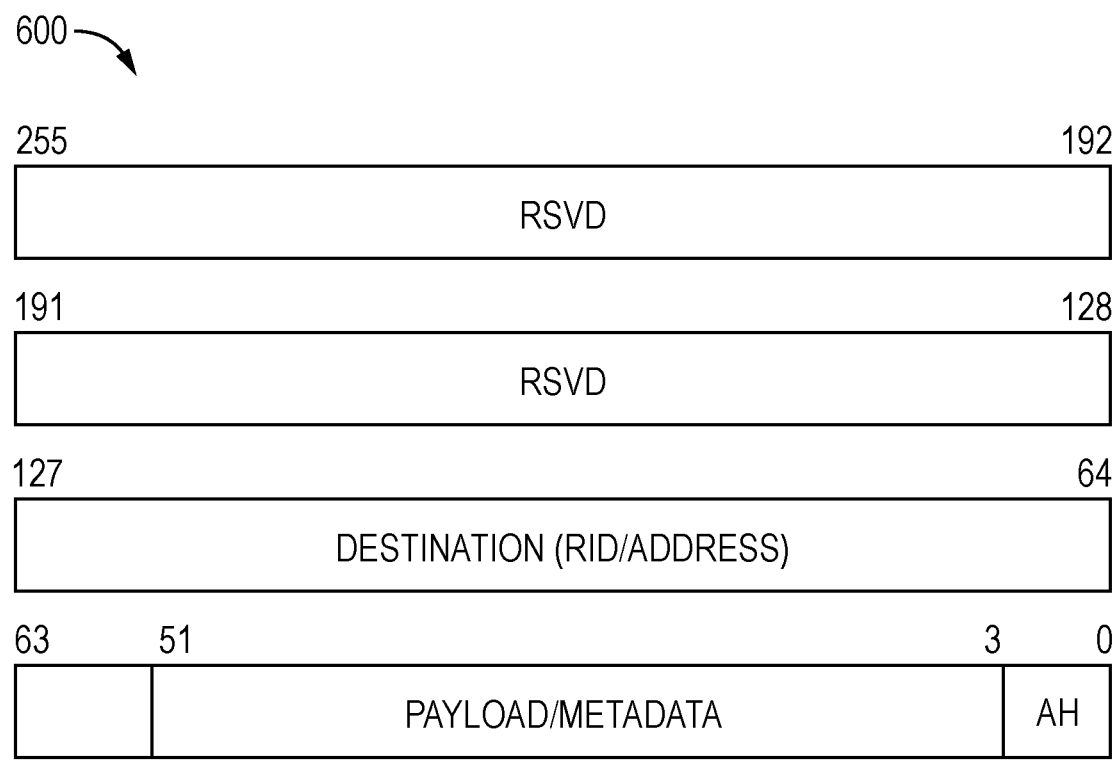
FIG. 6 illustrates a format for format for an input-output memory management unit (IOMMU) ping descriptor according to embodiments of the disclosure.

FIG. 6 illustrates a format 600 for format for an input-output memory management unit (IOMMU) ping descriptor according to embodiments of the disclosure. In one embodiment, IOMMU) ping descriptor is 256-bits wide (i.e., indexed from 0 to 256 bits).

In one embodiment of a trusted device (e.g., and interface and/or function) assignment phase, after the physical device authentication and link key provisioning, the VMM adds a new ping descriptor to the invalidation queue of the corresponding IOMMU (e.g., under whose scope the device under consideration lies). The ping descriptor is identified by the IOMMU by its unique identifier code (for example, in "Ah" field in bits 3:0) in descriptor structure in FIG. 6. In the depicted format, the ping descriptor destination field would contain the Requestor ID (e.g., BDF) of the device (e.g., physical device) to be pinged, for example, with the ping including sending the unique IOMMU identifier to the device. However, a ping descriptor format can be defined to be more generic as shown in FIG. 6. Like other descriptors in an invalidation queue, and to maintain consistency with existing IOMMU designs, ping descriptor may include one or more reserved (Rsvd) fields. There is a destination encoding section in bit positions [64]-[127] which can store (i) the RID of device to be pinged, for example, for an ID routed message) or (ii) the MMIO address in device memory to be pinged (e.g., for address routed message). Furthermore, the ping descriptor 600 can include fields to carry metadata or payload as applicable, such as the TA supplied nonce in one embodiment.

Figure 7:
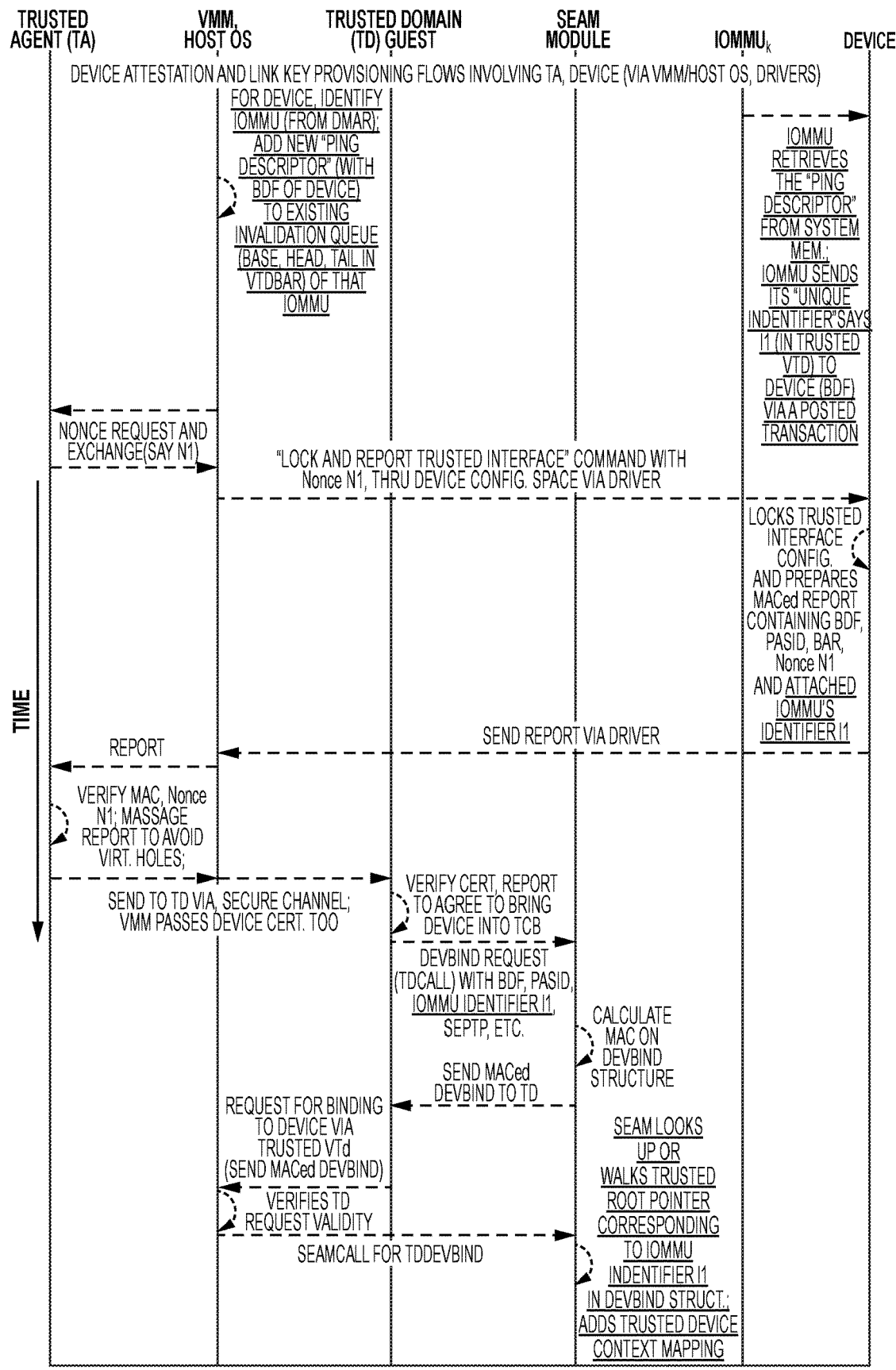
FIG. 7 illustrates representative flows for sending a trusted ping to a device and the consequent device operation and verification for device to input-output memory management unit (IOMMU) attachment according to embodiments of the disclosure.

FIG. 7 illustrates representative flows for sending a trusted ping to a device and the consequent device operation and verification for device to input-output memory management unit (IOMMU) attachment according to embodiments of the disclosure. As shown via underlined text, the unique IOMMU identifier is used for device operation and verification for device to input-output memory management unit (IOMMU) attachment.

Further, as shown in FIG. 7, on processing the ping descriptor, the IOMMU sends its unique identifier (for example, stored in trusted VTD register space, e.g., in 404 in FIG. 4)) to the device identified by the requestor ID (e.g., BDF) in ping request. This transfer is done through IOMMU generating a posted transaction which is ID routed in one embodiment. In one embodiment, an implementation is through a specific new "message with data" (MsgD) type of transaction for this "trusted ping" purpose, e.g., in addition to a device address translation cache (ATC) invalidation request message or Page Group Response message sent by IOMMU (e.g., via root complex) as part of PCIe address translation service (ATS) protocol specifications. Furthermore, there are other options of "nonce" communication (e.g., to report freshness to the corresponding device). Examples of these include:

1) As shown in FIG. 7, the nonce transfer mechanism from the trusted agent can go through the TA-VMM-Device driver route as part of "Lock and Report Trusted Interface" command. This command and nonce would be communicated via new standard interface in the extended device configuration space in certain embodiments.

2) In certain embodiments, with the proposed "trusted ping" required to be sent from IOMMU to device, the nonce from the trusted agent can be added as payload in the ping descriptor, and submitted to queue by VMM (e.g., in an exchange between TA and VMM beforehand). Along with the unique identifier, the IOMMU may sends the nonce to the device via the posted transaction. The "Lock and Report Trusted Configuration" command can be submitted by VMM through driver as suggested in 1) above.

3) Along with sending the nonce as suggested in 2), the "Trusted Ping" transaction can itself serve as the command to the device for initiating the locking and reporting trusted interface step. In that case, no separate configuration access interface is used as described in 1).

In response to a "Lock and Trusted Interface Report" command, the device locks the configuration of the corresponding interface (e.g., physical function (PF)/virtual function (VF)/Assignable Device Interface (ADI)) and generates the posture report along with the message authentication code (MAC) with a key pre-negotiated with the trusted agent in certain embodiments. The report structure (e.g., in addition to information about vendor ID, class ID, requestor ID, default PASID, link security status, MMIO BARs etc.) includes the nonce sent as part of request as well as the unique IOMMU identifier received by device from corresponding IOMMU in certain embodiments. In one embodiment, the report structure is read by VMM (e.g., through device driver) from extended configuration register, e.g., in addition to a device certificate in a PCIe attestation flow. The device report is sent to a trusted agent (e.g., SEAM module) in certain embodiments. In certain embodiments (e.g., after verification of nonce and MAC), the TA modifies the report to avoid any virtualization holes (e.g. calculating BAR HPA hashes) and sends to TD (e.g., with a new MAC calculated with key exchanged with TD) along with device certificate. In one embodiment, the IOMMU identifier flows with this report to TD. The TD guest validates the certificate and associated report to make the decision of bringing the corresponding device (or an interface of device to be assigned to TD) into its TCB.

IOMMU-Device Attach Verification

In one embodiment for device (e.g., and function and/or interface) binding via trusted IOMMU/VTD context, the TD performs a trusted domain call (TDCALL) to SEAM module with an associated device bind (DEVBIND) request. As part of the TDCALL, the device is sent the address of or the actual DEVBIND report structure containing the RID (e.g., BDF), Process Address Space ID (PASID) (e.g., from device report), secure EPT pointer, first level pointer if applicable, VTD map settings, and/or the corresponding unique IOMMU identifier (e.g., from device report). In one embodiment, a SEAM module calculates the MAC on the DEVBIND structure with a special key and returns control back to corresponding TD. Next the TD requests a trusted domain to device binding (TDDEVBIND) using the MACed DEVBIND structure. In certain embodiments, a VMM verifies the validity of the DEVBIND request made by the TD, e.g., by checking if the PASID asked for is indeed allocated to the corresponding TD and tracked in the PASID tracker table. In one embodiment, after the SEAM module receives the verification of validity of a TD bind request from VMM (e.g., as shown in FIG. 7, the SEAM module adds the trusted VT-d binding/mappings to its tracking data structure, e.g., through corresponding IOMMU root-context-PASID tables.

In certain embodiments, the final portion of the IOMMU device attachment verification loop comes when the SEAM identifies the IOMMU on platform corresponding to the IOMMU identifier and looks up the Trusted Root Pointer for secure VTD attach. In one embodiment (e.g., where trusted root pointer is allocated on demand), if the trusted root pointer is not yet allocated, the SEAM module starts with a page (e.g., from VMM) as trusted root table for that IOMMU and tracks the associated trusted root pointer. In certain embodiments, the SEAM module then programs the corresponding register in trusted VTD register space. As discussed above, the trusted root pointer may be configured beforehand when the unique IOMMU identifier is programmed initially for an IOMMU. Alternately, e.g., for efficiency of trusted IOTLB and other translation cache invalidations, the SEAM module only allocates a program trusted root pointer when it receives the first trusted binding request for a device in scope of that IOMMU. In certain embodiments, the SEAM module consequently tracks which IOMMUs have the trusted root pointer programmed for their consideration for secure invalidations in respective scenarios.

In certain embodiments, if the IOMMU identifier does not correspond to any IOMMU, the SEAM module will not bind the corresponding device. In addition, if the device did not receive any ping from its corresponding IOMMU (e.g., due to VMM/BIOS falsifying IOMMU information or mentioning different IOMMU under which say a hack device of same RID, as part of the device report, a trusted device sends back a fixed default value (e.g., that is to never be used as a unique IOMMU identifier) such that it is guaranteed that no IOMMU identifier will match by the SEAM module (or a different default random number which in all probability would not match an IOMMU identifier). In certain embodiments, a hack device also receives the ping and sends back IOMMU identifier as part of its report. However, in certain embodiments it would be rejected by the TD during authentication. So overall, at minimal additions to current IOMMU hardware capabilities as well as TDX trusted IO operation flows, secure verification of device attachment to corresponding IOMMU on platform is performed by SEAM module (or circuitry) through the proposed "trusted ping" mechanism and other embodiments. Note, in certain embodiments of TDX Trusted IO architecture, each IOMMU has its own Trusted Root Pointer.

FIG. 8 illustrates a flow diagram 800 according to embodiments of the disclosure. Depicted flow diagram 800 includes coupling a first device to memory with a first input-output memory management circuit 802; coupling a second device to the memory with a second input-output memory management circuit 804; assigning a first unique identification value for the first input-output memory management circuit by a processor in secure arbitration mode 806; assigning a second unique identification value for the second input-output memory management circuit by the processor in the secure arbitration mode 808; sending the first unique identification value to the first device during a secure assignment of the first device to a first trusted domain of the memory by the processor in the secure arbitration mode 810; and sending the second unique identification value to the second device during a secure assignment of the second device to a second trusted domain of the memory by the processor in the secure arbitration mode 812.

At least some embodiments of the disclosed technologies can be described in view of the following examples:

Example 1

An apparatus (e.g., SoC) comprising:
a first input-output memory management circuit to couple a first device to memory;
a second input-output memory management circuit to couple a second device to the memory; and
a processor to execute secure arbitration mode firmware to cause a first unique identification value to be assigned for the first input-output memory management circuit, a second unique identification value to be assigned for the second input-output memory management circuit, send the first unique identification value to the first device during a secure assignment of the first device to a first trusted domain of the memory, and send the second unique identification value to the second device during a secure assignment of the second device to a second trusted domain of the memory.

Example 2

The apparatus of example 1, wherein only execution of the secure arbitration mode firmware causes the first unique identification value to be assigned for the first input-output memory management circuit or the second unique identification value to be assigned for the second input-output memory management circuit.

Example 3

The apparatus of example 1, wherein the first unique identification value and the second unique identification value are stored in a protected register that is only accessible by the secure arbitration mode firmware.

Example 4

The apparatus of example 1, wherein the first device and a third device coupled to the memory have a same requester identification value.

Example 5

The apparatus of example 4, wherein the processor is to execute the secure arbitration mode firmware to cause a request to be sent from the processor to the third device for an identification value, and block access for the third device unless the third device sends the first unique identification value in a response message.

Example 6

The apparatus of example 1, wherein the processor is to execute the secure arbitration mode firmware to cause a request to be sent from the processor to a device coupled to the memory, and allow memory access to the first trusted domain of the memory by the device only when the device sends the first unique identification value in a response message.

Example 7

The apparatus of example 6, wherein the memory access is a direct memory access by the device.

Example 8

The apparatus of example 6, wherein, when the device sends the first unique identification value in the response message, the processor is to execute the secure arbitration mode firmware to select a trusted root pointer to use to perform the device to first input-output memory management circuit attachment.

Example 9

A method comprising:
coupling a first device to memory with a first input-output memory management circuit;
coupling a second device to the memory with a second input-output memory management circuit;
assigning a first unique identification value for the first input-output memory management circuit by a processor in secure arbitration mode;
assigning a second unique identification value for the second input-output memory management circuit by the processor in the secure arbitration mode;
sending the first unique identification value to the first device during a secure assignment of the first device to a first trusted domain of the memory by the processor in the secure arbitration mode; and
sending the second unique identification value to the second device during a secure assignment of the second device to a second trusted domain of the memory by the processor in the secure arbitration mode.

Example 10

The method of example 9, wherein only the processor in the secure arbitration mode causes the first unique identification value to be assigned for the first input-output memory management circuit and the second unique identification value to be assigned for the second input-output memory management circuit.

Example 11

The method of example 9, further comprising the processor in the secure arbitration mode storing the first unique identification value and the second unique identification value in a protected register that is only accessible by the processor in the secure arbitration mode.

Example 12

The method of example 9, wherein the first device and a third device coupled to the memory have a same requester identification value.

Example 13

The method of example 12, further comprising the processor in the secure arbitration mode causing a request to be sent from the processor to the third device for an identification value, and blocking access for the third device unless the third device sends the first unique identification value in a response message.

Example 14

The method of example 9, further comprising the processor in the secure arbitration mode causing a request to be sent from the processor to a device coupled to the memory, and allow memory access to the first trusted domain of the memory by the device only when the device sends the first unique identification value in a response message.

Example 15

The method of example 14, wherein the memory access is a direct memory access by the device.

Example 16

The method of example 14, wherein, when the device sends the first unique identification value in the response message, the processor in the secure arbitration mode selects a trusted root pointer to use to perform the device to first input-output memory management circuit attachment.

Example 17

A non-transitory machine readable medium that stores code that when executed by a machine causes the machine to perform a method comprising:
coupling a first device to memory with a first input-output memory management circuit;
coupling a second device to the memory with a second input-output memory management circuit;
assigning a first unique identification value for the first input-output memory management circuit by a processor in secure arbitration mode;
assigning a second unique identification value for the second input-output memory management circuit by the processor in the secure arbitration mode;
sending the first unique identification value to the first device during a secure assignment of the first device to a first trusted domain of the memory by the processor in the secure arbitration mode; and
sending the second unique identification value to the second device during a secure assignment of the second device to a second trusted domain of the memory by the processor in the secure arbitration mode.

Example 18

The non-transitory machine readable medium of example 17, wherein only the processor in the secure arbitration mode causes the first unique identification value to be assigned for the first input-output memory management circuit and the second unique identification value to be assigned for the second input-output memory management circuit.

Example 19

The non-transitory machine readable medium of example 17, further comprising the processor in the secure arbitration mode storing the first unique identification value and the second unique identification value in a protected register that is only accessible by the processor in the secure arbitration mode.

Example 20

The non-transitory machine readable medium of example 17, wherein the first device and a third device coupled to the memory have a same requester identification value.

Example 21

The non-transitory machine readable medium of example 20, further comprising the processor in the secure arbitration mode causing a request to be sent from the processor to the third device for an identification value, and blocking access for the third device unless the third device sends the first unique identification value in a response message.

Example 22

The non-transitory machine readable medium of example 17, further comprising the processor in the secure arbitration mode causing a request to be sent from the processor to a device coupled to the memory, and allow memory access to the first trusted domain of the memory by the device only when the device sends the first unique identification value in a response message.

Example 23

The non-transitory machine readable medium of example 22, wherein the memory access is a direct memory access by the device.

Example 24

The non-transitory machine readable medium of example 22, wherein, when the device sends the first unique identification value in the response message, the processor in the secure arbitration mode selects a trusted root pointer to use to perform the device to first input-output memory management circuit attachment.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 9A:
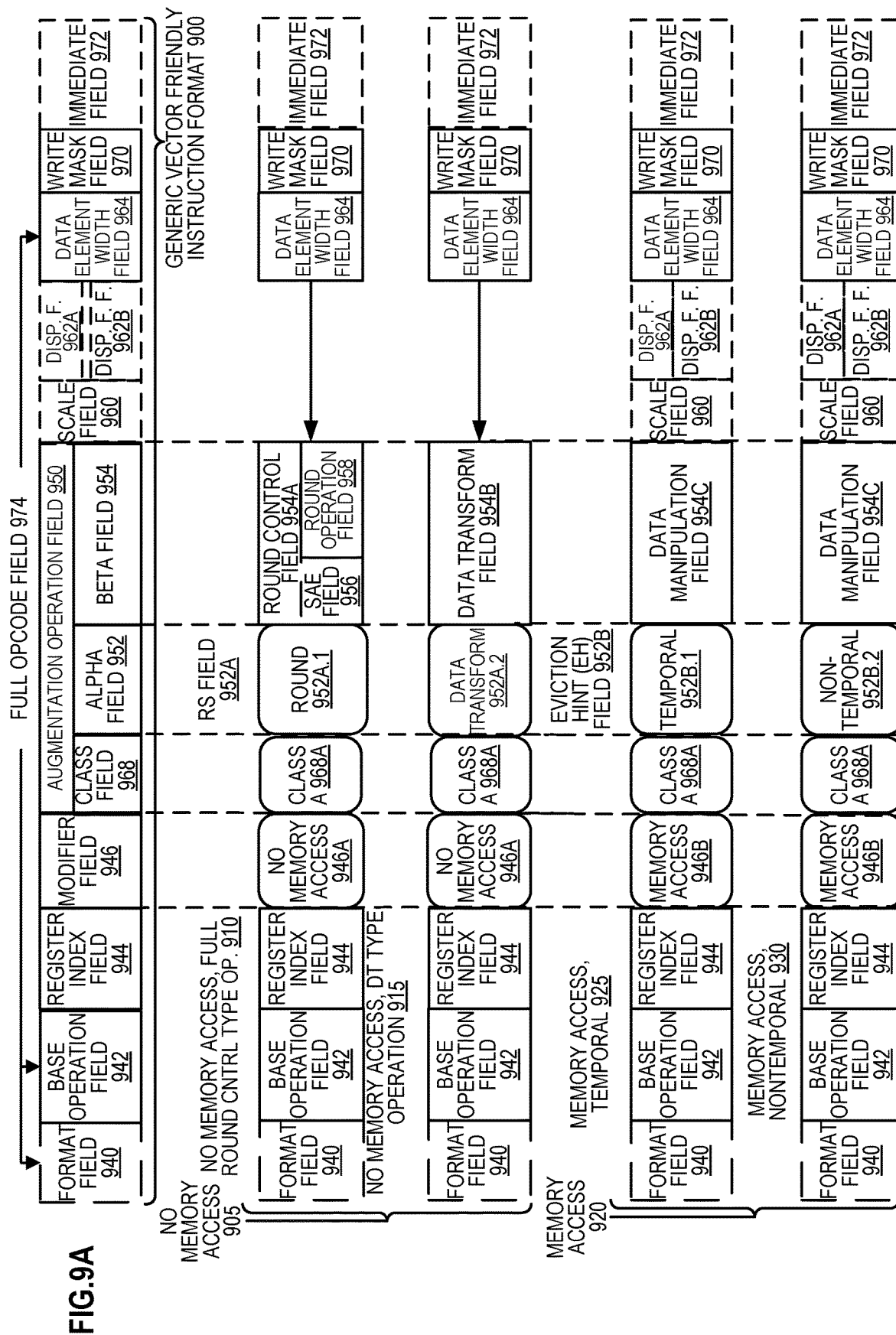
FIG. 9A is a block diagram illustrating a generic vector friendly instruction format and class A instruction templates thereof according to embodiments of the disclosure.
Figure 9B:
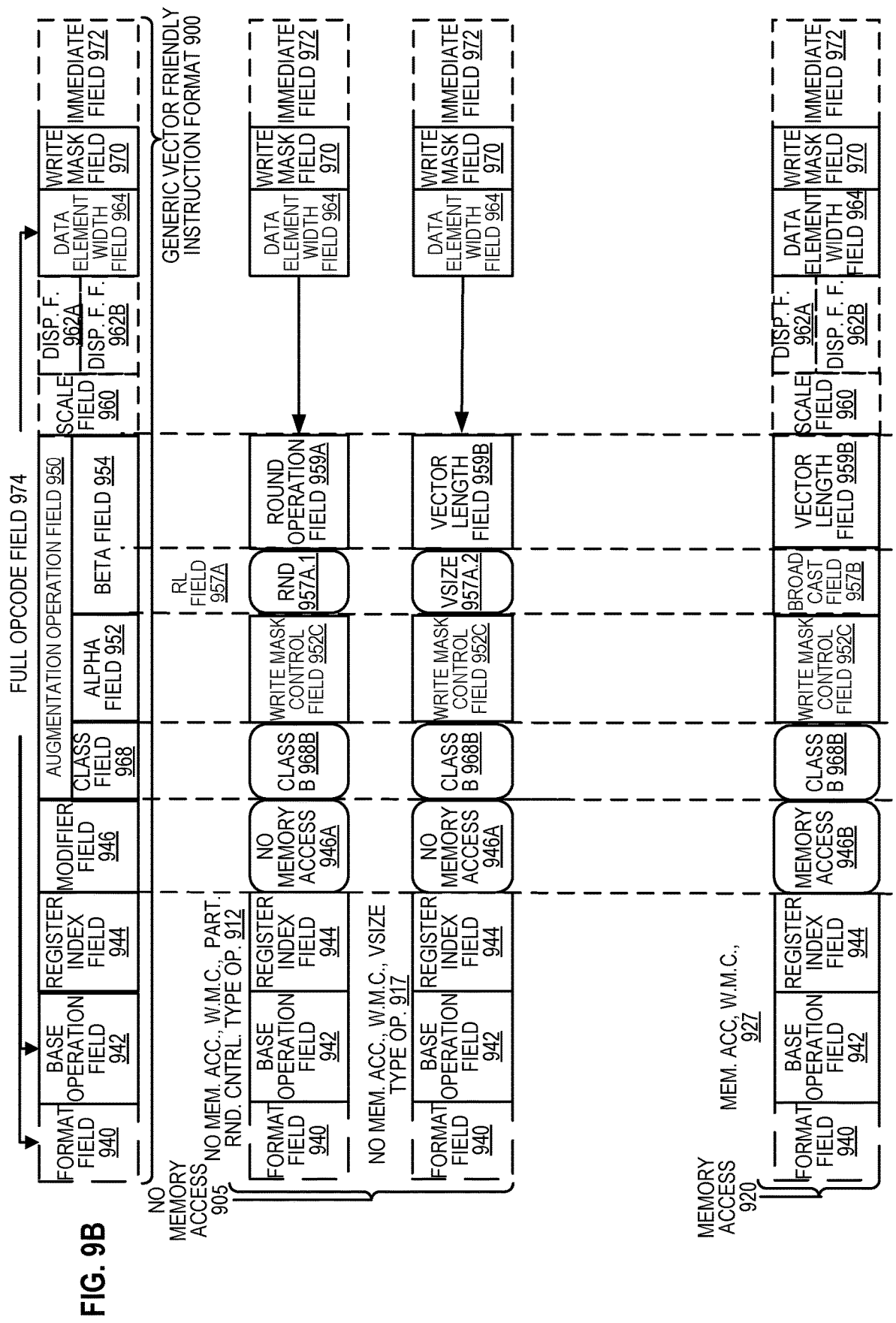
FIG. 9B is a block diagram illustrating the generic vector friendly instruction format and class B instruction templates thereof according to embodiments of the disclosure.

FIGS. 9A-9B are block diagrams illustrating a generic vector friendly instruction format and instruction templates thereof according to embodiments of the disclosure. FIG. 9A is a block diagram illustrating a generic vector friendly instruction format and class A instruction templates thereof according to embodiments of the disclosure; while FIG. 9B is a block diagram illustrating the generic vector friendly instruction format and class B instruction templates thereof according to embodiments of the disclosure. Specifically, a generic vector friendly instruction format 900 for which are defined class A and class B instruction templates, both of which include no memory access 905 instruction templates and memory access 920 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 9A include: 1) within the no memory access 905 instruction templates there is shown a no memory access, full round control type operation 910 instruction template and a no memory access, data transform type operation 915 instruction template; and 2) within the memory access 920 instruction templates there is shown a memory access, temporal 925 instruction template and a memory access, non-temporal 930 instruction template. The class B instruction templates in FIG. 9B include: 1) within the no memory access 905 instruction templates there is shown a no memory access, write mask control, partial round control type operation 912 instruction template and a no memory access, write mask control, vsize type operation 917 instruction template; and 2) within the memory access 920 instruction templates there is shown a memory access, write mask control 927 instruction template.

The generic vector friendly instruction format 900 includes the following fields listed below in the order illustrated in FIGS. 9A-9B.

Format field 940—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 942—its content distinguishes different base operations.

Register index field 944—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 946—its content distinguishes occurrences of instructions in the generic vector instruction format that specify memory access from those that do not; that is, between no memory access 905 instruction templates and memory access 920 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 950—its content distinguishes which one of a variety of different operations to be performed in addition to the base operation. This field is context specific. In one embodiment of the disclosure, this field is divided into a class field 968, an alpha field 952, and a beta field 954. The augmentation operation field 950 allows common groups of operations to be performed in a single instruction rather than 2, 3, or 4 instructions.

Scale field 960—its content allows for the scaling of the index field's content for memory address generation (e.g., for address generation that uses $2^{scale}*\text{index}+\text{base}$).

Displacement Field 962A—its content is used as part of memory address generation (e.g., for address generation that uses $2^{scale}*\text{index}+\text{base}+\text{displacement}$).

Displacement Factor Field 962B (note that the juxtaposition of displacement field 962A directly over displacement factor field 962B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 974 (described later herein) and the data manipulation field 954C. The displacement field 962A and the displacement factor field 962B are optional in the sense that they are not used for the no memory access 905 instruction templates and/or different embodiments may implement only one or none of the two.

Data element width field 964—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 970—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 970 allows for partial vector operations, including loads, stores, arithmetic, logical, etc. While embodiments of the disclosure are described in which the write mask field's 970 content selects one of a number of write mask registers that contains the write mask to be used (and thus the write mask field's 970 content indirectly identifies that masking to be performed), alternative embodiments instead or additional allow the mask write field's 970 content to directly specify the masking to be performed.

Immediate field 972—its content allows for the specification of an immediate. This field is optional in the sense that is it not present in an implementation of the generic vector friendly format that does not support immediate and it is not present in instructions that do not use an immediate.

Class field 968—its content distinguishes between different classes of instructions. With reference to FIGS. 9A-B, the contents of this field select between class A and class B instructions. In FIGS. 9A-B, rounded corner squares are used to indicate a specific value is present in a field (e.g., class A 968A and class B 968B for the class field 968 respectively in FIGS. 9A-B).

Instruction Templates of Class A

In the case of the non-memory access 905 instruction templates of class A, the alpha field 952 is interpreted as an RS field 952A, whose content distinguishes which one of the different augmentation operation types are to be performed (e.g., round 952A.1 and data transform 952A.2 are respectively specified for the no memory access, round type operation 910 and the no memory access, data transform type operation 915 instruction templates), while the beta field 954 distinguishes which of the operations of the specified type is to be performed. In the no memory access 905 instruction templates, the scale field 960, the displacement field 962A, and the displacement scale filed 962B are not present.

No-Memory Access Instruction Templates—Full Round Control Type Operation

In the no memory access full round control type operation 910 instruction template, the beta field 954 is interpreted as a round control field 954A, whose content(s) provide static rounding. While in the described embodiments of the disclosure the round control field 954A includes a suppress all floating point exceptions (SAE) field 956 and a round operation control field 958, alternative embodiments may support may encode both these concepts into the same field or only have one or the other of these concepts/fields (e.g., may have only the round operation control field 958).

SAE field 956—its content distinguishes whether or not to disable the exception event reporting; when the SAE field's 956 content indicates suppression is enabled, a given instruction does not report any kind of floating-point exception flag and does not raise any floating point exception handler.

Round operation control field 958—its content distinguishes which one of a group of rounding operations to perform (e.g., Round-up, Round-down, Round-towards-zero and Round-to-nearest). Thus, the round operation control field 958 allows for the changing of the rounding mode on a per instruction basis. In one embodiment of the disclosure where a processor includes a control register for specifying rounding modes, the round operation control field's 950 content overrides that register value.

No Memory Access Instruction Templates—Data Transform Type Operation

In the no memory access data transform type operation 915 instruction template, the beta field 954 is interpreted as a data transform field 954B, whose content distinguishes which one of a number of data transforms is to be performed (e.g., no data transform, swizzle, broadcast).

In the case of a memory access 920 instruction template of class A, the alpha field 952 is interpreted as an eviction hint field 952B, whose content distinguishes which one of the eviction hints is to be used (in FIG. 9A, temporal 952B.1 and non-temporal 952B.2 are respectively specified for the memory access, temporal 925 instruction template and the memory access, non-temporal 930 instruction template), while the beta field 954 is interpreted as a data manipulation field 954C, whose content distinguishes which one of a number of data manipulation operations (also known as primitives) is to be performed (e.g., no manipulation; broadcast; up conversion of a source; and down conversion of a destination). The memory access 920 instruction templates include the scale field 960, and optionally the displacement field 962A or the displacement scale field 962B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 952 is interpreted as a write mask control (Z) field 952C, whose content distinguishes whether the write masking controlled by the write mask field 970 should be a merging or a zeroing.

In the case of the non-memory access 905 instruction templates of class B, part of the beta field 954 is interpreted as an RL field 957A, whose content distinguishes which one of the different augmentation operation types are to be performed (e.g., round 957A.1 and vector length (VSIZE) 957A.2 are respectively specified for the no memory access, write mask control, partial round control type operation 912 instruction template and the no memory access, write mask control, VSIZE type operation 917 instruction template), while the rest of the beta field 954 distinguishes which of the operations of the specified type is to be performed. In the no memory access 905 instruction templates, the scale field 960, the displacement field 962A, and the displacement scale filed 962B are not present.

In the no memory access, write mask control, partial round control type operation 910 instruction template, the rest of the beta field 954 is interpreted as a round operation field 959A and exception event reporting is disabled (a given instruction does not report any kind of floating-point exception flag and does not raise any floating point exception handler).

Round operation control field 959A—just as round operation control field 958, its content distinguishes which one of a group of rounding operations to perform (e.g., Round-up, Round-down, Round-towards-zero and Round-to-nearest). Thus, the round operation control field 959A allows for the changing of the rounding mode on a per instruction basis. In one embodiment of the disclosure where a processor includes a control register for specifying rounding modes, the round operation control field's 950 content overrides that register value.

In the no memory access, write mask control, VSIZE type operation 917 instruction template, the rest of the beta field 954 is interpreted as a vector length field 959B, whose content distinguishes which one of a number of data vector lengths is to be performed on (e.g., 128, 256, or 512 byte).

In the case of a memory access 920 instruction template of class B, part of the beta field 954 is interpreted as a broadcast field 957B, whose content distinguishes whether or not the broadcast type data manipulation operation is to be performed, while the rest of the beta field 954 is interpreted the vector length field 959B. The memory access 920 instruction templates include the scale field 960, and optionally the displacement field 962A or the displacement scale field 962B.

With regard to the generic vector friendly instruction format 900, a full opcode field 974 is shown including the format field 940, the base operation field 942, and the data element width field 964. While one embodiment is shown where the full opcode field 974 includes all of these fields, the full opcode field 974 includes less than all of these fields in embodiments that do not support all of them. The full opcode field 974 provides the operation code (opcode).

The augmentation operation field 950, the data element width field 964, and the write mask field 970 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 10 is a block diagram illustrating an exemplary specific vector friendly instruction format according to embodiments of the disclosure. FIG. 10 shows a specific vector friendly instruction format 1000 that is specific in the sense that it specifies the location, size, interpretation, and order of the fields, as well as values for some of those fields. The specific vector friendly instruction format 1000 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 9 into which the fields from FIG. 10 map are illustrated.

It should be understood that, although embodiments of the disclosure are described with reference to the specific vector friendly instruction format 1000 in the context of the generic vector friendly instruction format 900 for illustrative purposes, the disclosure is not limited to the specific vector friendly instruction format 1000 except where claimed. For example, the generic vector friendly instruction format 900 contemplates a variety of possible sizes for the various fields, while the specific vector friendly instruction format 1000 is shown as having fields of specific sizes. By way of specific example, while the data element width field 964 is illustrated as a one bit field in the specific vector friendly instruction format 1000, the disclosure is not so limited (that is, the generic vector friendly instruction format 900 contemplates other sizes of the data element width field 964).

The generic vector friendly instruction format 900 includes the following fields listed below in the order illustrated in FIG. 10A.

EVEX Prefix (Bytes 0-3) 1002—is encoded in a four-byte form.

Format Field 940 (EVEX Byte 0, bits [7:0])—the first byte (EVEX Byte 0) is the format field 940 and it contains 0x62 (the unique value used for distinguishing the vector friendly instruction format in one embodiment of the disclosure).

The second-fourth bytes (EVEX Bytes 1-3) include a number of bit fields providing specific capability.

REX field 1005 (EVEX Byte 1, bits [7-5])—consists of a EVEX.R bit field (EVEX Byte 1, bit [7]-R), EVEX.X bit field (EVEX byte 1, bit [6]-X), and 957BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 910—this is the first part of the REX' field 910 and is the EVEX.R' bit field (EVEX Byte 1, bit [4]-R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD RIM field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1015 (EVEX byte 1, bits [3:0]-mmmm)—its content encodes an implied leading opcode byte (0F, 0F 38, or 0F 3).

Data element width field 964 (EVEX byte 2, bit [7]-W)—is represented by the notation EVEX.W. EVEX.W is used to define the granularity (size) of the datatype (either 32-bit data elements or 64-bit data elements).

EVEX.vvvv 1020 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1020 encodes the 4 low-order bits of the first source register specifier stored in inverted (1s complement) form. Depending on the instruction, an extra different EVEX bit field is used to extend the specifier size to 32 registers.

EVEX.U 968 Class field (EVEX byte 2, bit [2]-U)—If EVEX.U=0, it indicates class A or EVEX.U0; if EVEX.U=1, it indicates class B or EVEX.U1.

Prefix encoding field 1025 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decode circuit's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 952 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 954 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 910—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 970 (EVEX byte 3, bits [2:0]-kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 1030 (Byte 4) is also known as the opcode byte. Part of the opcode is specified in this field.

MOD R/M Field 1040 (Byte 5) includes MOD field 1042, Reg field 1044, and R/M field 1046. As previously described, the MOD field's 1042 content distinguishes between memory access and non-memory access operations. The role of Reg field 1044 can be summarized to two situations: encoding either the destination register operand or a source register operand, or be treated as an opcode extension and not used to encode any instruction operand. The role of R/M field 1046 may include the following: encoding the instruction operand that references a memory address, or encoding either the destination register operand or a source register operand.

Scale, Index, Base (SIB) Byte (Byte 6)—As previously described, the scale field's 950 content is used for memory address generation. SIB.xxx 1054 and SIB.bbb 1056—the contents of these fields have been previously referred to with regard to the register indexes Xxxx and Bbbb.

Displacement field 962A (Bytes 7-10)—when MOD field 1042 contains 10, bytes 7-10 are the displacement field 962A, and it works the same as the legacy 32-bit displacement (disp32) and works at byte granularity.

Displacement factor field 962B (Byte 7)—when MOD field 1042 contains 01, byte 7 is the displacement factor field 962B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 962B is a reinterpretation of disp8; when using displacement factor field 962B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 962B substitutes the legacy x86 instruction set 8-bit displacement. Thus, the displacement factor field 962B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 972 operates as previously described.

Full Opcode Field

FIG. 10B is a block diagram illustrating the fields of the specific vector friendly instruction format 1000 that make up the full opcode field 974 according to one embodiment of the disclosure. Specifically, the full opcode field 974 includes the format field 940, the base operation field 942, and the data element width (W) field 964. The base operation field 942 includes the prefix encoding field 1025, the opcode map field 1015, and the real opcode field 1030.

Register Index Field

FIG. 10C is a block diagram illustrating the fields of the specific vector friendly instruction format 1000 that make up the register index field 944 according to one embodiment of the disclosure. Specifically, the register index field 944 includes the REX field 1005, the REX' field 1010, the MODR/M.reg field 1044, the MODR/M.r/m field 1046, the VVVV field 1020, xxx field 1054, and the bbb field 1056.

Augmentation Operation Field

Figure 10D:
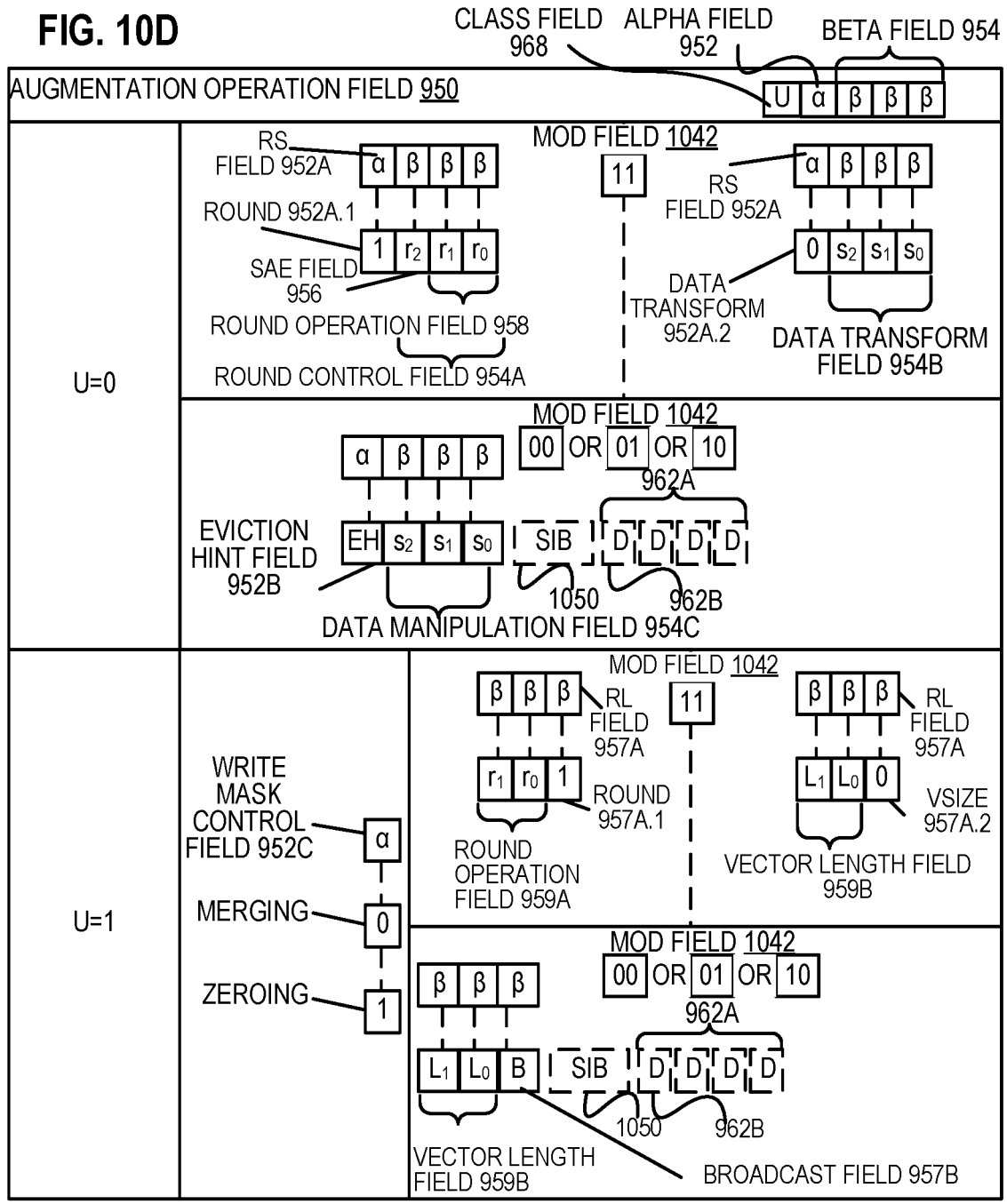
FIG. 10D is a block diagram illustrating the fields of the specific vector friendly instruction format in FIG. 10A that make up the augmentation operation field 950 according to one embodiment of the disclosure.

FIG. 10D is a block diagram illustrating the fields of the specific vector friendly instruction format 1000 that make up the augmentation operation field 950 according to one embodiment of the disclosure. When the class (U) field 968 contains 0, it signifies EVEX.U0 (class A 968A); when it contains 1, it signifies EVEX.U1 (class B 968B). When U=0 and the MOD field 1042 contains 11 (signifying a no memory access operation), the alpha field 952 (EVEX byte 3, bit [7]-EH) is interpreted as the rs field 952A. When the rs field 952A contains a 1 (round 952A.1), the beta field 954 (EVEX byte 3, bits [6:4]-SSS) is interpreted as the round control field 954A. The round control field 954A includes a one bit SAE field 956 and a two bit round operation field 958. When the rs field 952A contains a 0 (data transform 952A.2), the beta field 954 (EVEX byte 3, bits [6:4]-SSS) is interpreted as a three bit data transform field 954B. When U=0 and the MOD field 1042 contains 00, 01, or 10 (signifying a memory access operation), the alpha field 952 (EVEX byte 3, bit [7]-EH) is interpreted as the eviction hint (EH) field 952B and the beta field 954 (EVEX byte 3, bits [6:4]-SSS) is interpreted as a three bit data manipulation field 954C.

When U=1, the alpha field 952 (EVEX byte 3, bit [7]-EH) is interpreted as the write mask control (Z) field 952C. When U=1 and the MOD field 1042 contains 11 (signifying a no memory access operation), part of the beta field 954 (EVEX byte 3, bit [4]-$S_0$) is interpreted as the RL field 957A; when it contains a 1 (round 957A.1) the rest of the beta field 954 (EVEX byte 3, bit [6-5]-$S_{2-1}$) is interpreted as the round operation field 959A, while when the RL field 957A contains a 0 (VSIZE 957.A2) the rest of the beta field 954 (EVEX byte 3, bit [6-5]-$S_{2-1}$) is interpreted as the vector length field 959B (EVEX byte 3, bit [6-5]-$L_{1-0}$). When U=1 and the MOD field 1042 contains 00, 01, or 10 (signifying a memory access operation), the beta field 954 (EVEX byte 3, bits [6:4]-SSS) is interpreted as the vector length field 959B (EVEX byte 3, bit [6-5]-$L_{1-0}$) and the broadcast field 957B (EVEX byte 3, bit [4]-B).

Exemplary Register Architecture

Figure 11:
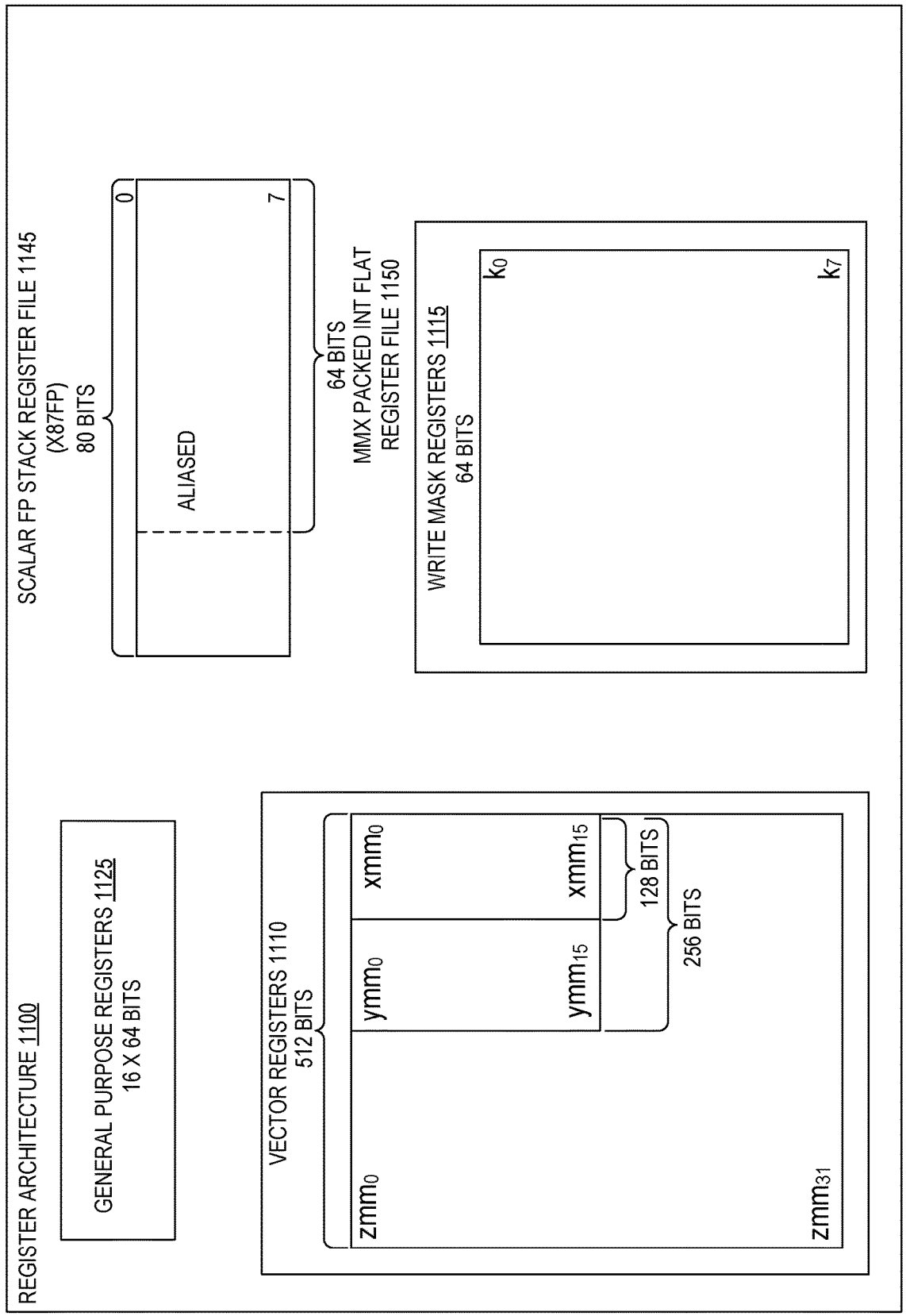
FIG. 11 is a block diagram of a register architecture according to one embodiment of the disclosure

FIG. 11 is a block diagram of a register architecture 1100 according to one embodiment of the disclosure. In the embodiment illustrated, there are 32 vector registers 1110 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1000 operates on these overlaid register file as illustrated in the below tables.

| Adjustable Vector Length | Class | Operations | Registers |
|---|---|---|---|
| Instruction Templates that do not include the vector length field 959B | A (FIG. 9A; U = 0) | 910, 915, 925, 930 | zmm registers (the vector length is 64 byte) |
| | B (FIG. 9B; U = 1) | 912 | zmm registers (the vector length is 64 byte) |
| Instruction templates that do include the vector length field 959B | B (FIG. 9B; U = 1) | 917, 927 | zmm, ymm, or xmm registers (the vector length is 64 byte, 32 byte, or 16 byte) depending on the vector length field 959B |

In other words, the vector length field 959B selects between a maximum length and one or more other shorter lengths, where each such shorter length is half the length of the preceding length; and instructions templates without the vector length field 959B operate on the maximum vector length. Further, in one embodiment, the class B instruction templates of the specific vector friendly instruction format 1000 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1115—in the embodiment illustrated, there are 8 write mask registers (k0 through k7), each 64 bits in size. In an alternate embodiment, the write mask registers 1115 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1125—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1145, on which is aliased the MMX packed integer flat register file 1150—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 12A is a block diagram illustrating both an exemplary in-order pipeline and an exemplary register renaming, out-of-order issue/execution pipeline according to embodiments of the disclosure. FIG. 12B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 12A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224.

FIG. 12B shows processor core 1290 including a front end unit 1230 coupled to an execution engine unit 1250, and both are coupled to a memory unit 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like.

The front end unit 1230 includes a branch prediction unit 1232 coupled to an instruction cache unit 1234, which is coupled to an instruction translation lookaside buffer (TLB) 1236, which is coupled to an instruction fetch unit 1238, which is coupled to a decode unit 1240. The decode unit 1240 (e.g., decode circuit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1290 includes a microcode ROM or other medium that stores microcode for certain macro-instructions (e.g., in decode unit 1240 or otherwise within the front end unit 1230). The decode unit 1240 is coupled to a rename/allocator unit 1252 in the execution engine unit 1250.

The execution engine unit 1250 includes the rename/allocator unit 1252 coupled to a retirement unit 1254 and a set of one or more scheduler unit(s) 1256. The scheduler unit(s) 1256 represents any number of different schedulers, including reservations stations, central instruction window, etc. The scheduler unit(s) 1256 is coupled to the physical register file(s) unit(s) 1258. Each of the physical register file(s) units 1258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1258 comprises a vector registers unit, a write mask registers unit, and a scalar registers unit. These register units may provide architectural vector registers, vector mask registers, and general purpose registers. The physical register file(s) unit(s) 1258 is overlapped by the retirement unit 1254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1254 and the physical register file(s) unit(s) 1258 are coupled to the execution cluster(s) 1260. The execution cluster(s) 1260 includes a set of one or more execution units 1262 (e.g., execution circuits) and a set of one or more memory access units 1264. The execution units 1262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1256, physical register file(s) unit(s) 1258, and execution cluster(s) 1260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1264). It should also be understood that where separate pipelines are used, one or more of these pipelines may be out-of-order issue/execution and the rest in-order.

The set of memory access units 1264 is coupled to the memory unit 1270, which includes a data TLB unit 1272 coupled to a data cache unit 1274 coupled to a level 2 (L2) cache unit 1276. In one exemplary embodiment, the memory access units 1264 may include a load unit, a store address unit, and a store data unit, each of which is coupled to the data TLB unit 1272 in the memory unit 1270. The instruction cache unit 1234 is further coupled to a level 2 (L2) cache unit 1276 in the memory unit 1270. The L2 cache unit 1276 is coupled to one or more other levels of cache and eventually to a main memory.

By way of example, the exemplary register renaming, out-of-order issue/execution core architecture may implement the pipeline 1200 as follows: 1) the instruction fetch 1238 performs the fetch and length decoding stages 1202 and 1204; 2) the decode unit 1240 performs the decode stage 1206; 3) the rename/allocator unit 1252 performs the allocation stage 1208 and renaming stage 1210; 4) the scheduler unit(s) 1256 performs the schedule stage 1212; 5) the physical register file(s) unit(s) 1258 and the memory unit 1270 perform the register read/memory read stage 1214; the execution cluster 1260 perform the execute stage 1216; 6) the memory unit 1270 and the physical register file(s) unit(s) 1258 perform the write back/memory write stage 1218; 7) various units may be involved in the exception handling stage 1222; and 8) the retirement unit 1254 and the physical register file(s) unit(s) 1258 perform the commit stage 1224.

The core 1290 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1290 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 1234/1274 and a shared L2 cache unit 1276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 13B:
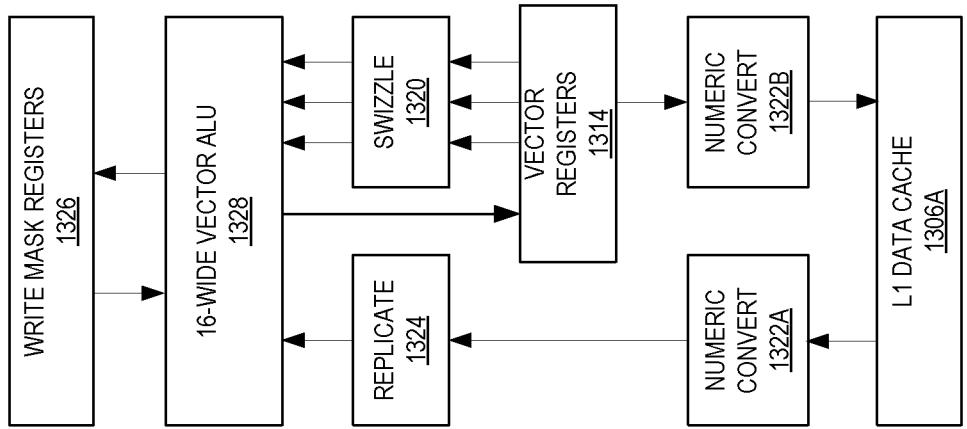
FIG. 13B is an expanded view of part of the processor core in FIG. 13A according to embodiments of the disclosure.
Figure 13A:
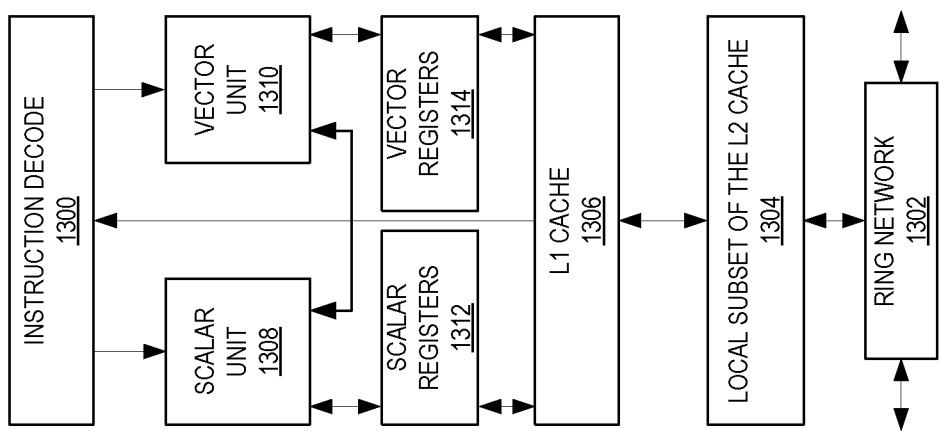
FIG. 13A is a block diagram of a single processor core, along with its connection to the on-die interconnect network and with its local subset of the Level 2 (L2) cache, according to embodiments of the disclosure.

FIGS. 13A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 13A is a block diagram of a single processor core, along with its connection to the on-die interconnect network 1302 and with its local subset of the Level 2 (L2) cache 1304, according to embodiments of the disclosure. In one embodiment, an instruction decode unit 1300 supports the x86 instruction set with a packed data instruction set extension. An L1 cache 1306 allows low-latency accesses to cache memory into the scalar and vector units. While in one embodiment (to simplify the design), a scalar unit 1308 and a vector unit 1310 use separate register sets (respectively, scalar registers 1312 and vector registers 1314) and data transferred between them is written to memory and then read back in from a level 1 (L1) cache 1306, alternative embodiments of the disclosure may use a different approach (e.g., use a single register set or include a communication path that allow data to be transferred between the two register files without being written and read back).

The local subset of the L2 cache 1304 is part of a global L2 cache that is divided into separate local subsets, one per processor core. Each processor core has a direct access path to its own local subset of the L2 cache 1304. Data read by a processor core is stored in its L2 cache subset 1304 and can be accessed quickly, in parallel with other processor cores accessing their own local L2 cache subsets. Data written by a processor core is stored in its own L2 cache subset 1304 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 13B is an expanded view of part of the processor core in FIG. 13A according to embodiments of the disclosure. FIG. 13B includes an L1 data cache 1306A part of the L1 cache 1304, as well as more detail regarding the vector unit 1310 and the vector registers 1314. Specifically, the vector unit 1310 is a 16-wide vector processing unit (VPU) (see the 16-wide ALU 1328), which executes one or more of integer, single-precision float, and double-precision float instructions. The VPU supports swizzling the register inputs with swizzle unit 1320, numeric conversion with numeric convert units 1322A-B, and replication with replication unit 1324 on the memory input. Write mask registers 1326 allow predicating resulting vector writes.

Figure 14:
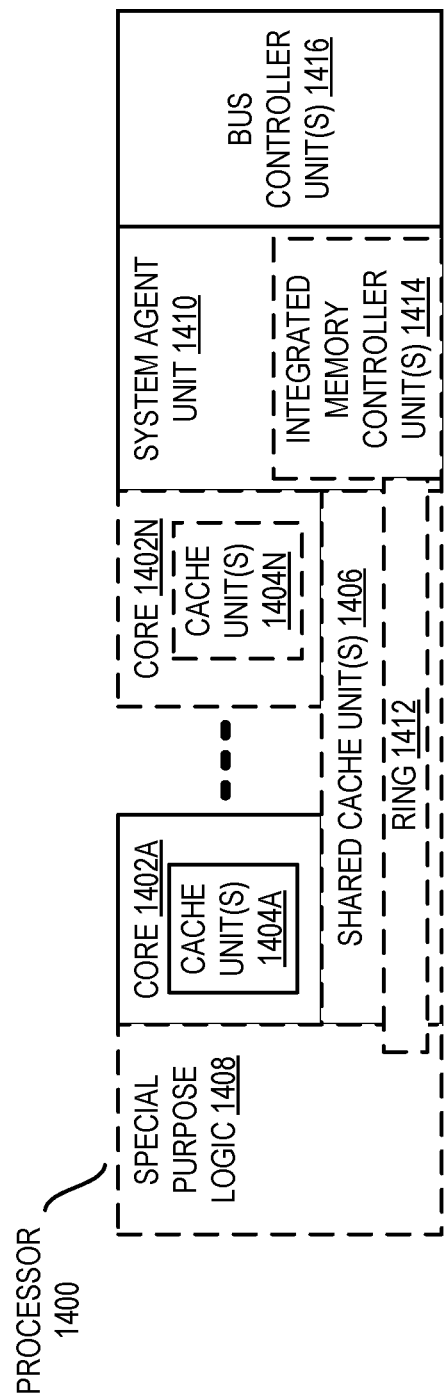
FIG. 14 is a block diagram of a processor that may have more than one core, may have an integrated memory controller, and may have integrated graphics according to embodiments of the disclosure.

FIG. 14 is a block diagram of a processor 1400 that may have more than one core, may have an integrated memory controller, and may have integrated graphics according to embodiments of the disclosure. The solid lined boxes in FIG. 14 illustrate a processor 1400 with a single core 1402A, a system agent 1410, a set of one or more bus controller units 1416, while the optional addition of the dashed lined boxes illustrates an alternative processor 1400 with multiple cores 1402A-N, a set of one or more integrated memory controller unit(s) 1414 in the system agent unit 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two); 2) a coprocessor with the cores 1402A-N being a large number of special purpose cores intended primarily for graphics and/or scientific (throughput); and 3) a coprocessor with the cores 1402A-N being a large number of general purpose in-order cores. Thus, the processor 1400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1406, and external memory (not shown) coupled to the set of integrated memory controller units 1414. The set of shared cache units 1406 may include one or more mid-level caches, such as level 2 (L2), level 3 (L3), level 4 (L4), or other levels of cache, a last level cache (LLC), and/or combinations thereof. While in one embodiment a ring based interconnect unit 1412 interconnects the integrated graphics logic 1408, the set of shared cache units 1406, and the system agent unit 1410/integrated memory controller unit(s) 1414, alternative embodiments may use any number of well-known techniques for interconnecting such units. In one embodiment, coherency is maintained between one or more cache units 1406 and cores 1402-A-N.

In some embodiments, one or more of the cores 1402A-N are capable of multi-threading. The system agent 1410 includes those components coordinating and operating cores 1402A-N. The system agent unit 1410 may include for example a power control unit (PCU) and a display unit. The PCU may be or include logic and components needed for regulating the power state of the cores 1402A-N and the integrated graphics logic 1408. The display unit is for driving one or more externally connected displays.

The cores 1402A-N may be homogenous or heterogeneous in terms of architecture instruction set; that is, two or more of the cores 1402A-N may be capable of execution the same instruction set, while others may be capable of executing only a subset of that instruction set or a different instruction set.

Exemplary Computer Architectures

FIGS. 15-18 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 15:
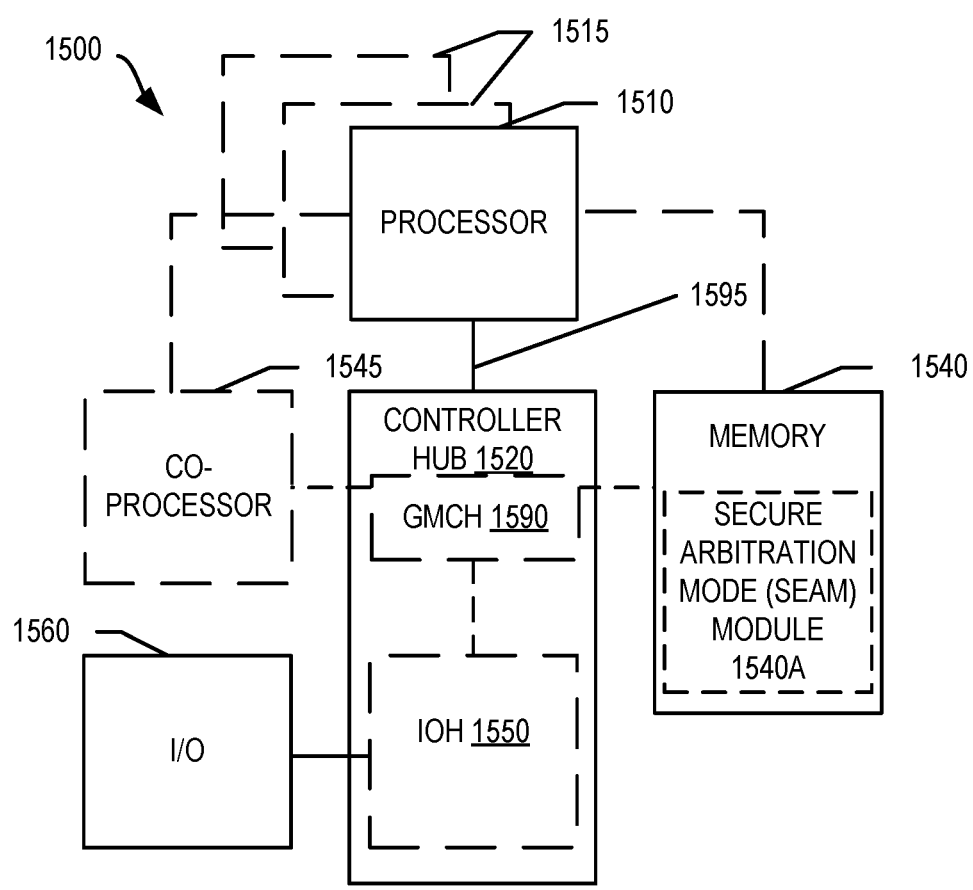
FIG. 15 is a block diagram of a system in accordance with one embodiment of the present disclosure.

Referring now to FIG. 15, shown is a block diagram of a system 1500 in accordance with one embodiment of the present disclosure. The system 1500 may include one or more processors 1510, 1515, which are coupled to a controller hub 1520. In one embodiment the controller hub 1520 includes a graphics memory controller hub (GMCH) 1590 and an Input/Output Hub (IOH) 1550 (which may be on separate chips); the GMCH 1590 includes memory and graphics controllers to which are coupled memory 1540 and a coprocessor 1545; the IOH 1550 is couples input/output (I/O) devices 1560 to the GMCH 1590. Alternatively, one or both of the memory and graphics controllers are integrated within the processor (as described herein), the memory 1540 and the coprocessor 1545 are coupled directly to the processor 1510, and the controller hub 1520 in a single chip with the IOH 1550. Memory 1540 may include a secure arbitration mode (SEAM) module 1540A, for example, to store code that when executed causes a processor to perform any method of this disclosure.

The optional nature of additional processors 1515 is denoted in FIG. 15 with broken lines. Each processor 1510, 1515 may include one or more of the processing cores described herein and may be some version of the processor 1400.

The memory 1540 may be, for example, dynamic random access memory (DRAM), phase change memory (PCM), or a combination of the two. For at least one embodiment, the controller hub 1520 communicates with the processor(s) 1510, 1515 via a multi-drop bus, such as a frontside bus (FSB), point-to-point interface such as Quickpath Interconnect (QPI), or similar connection 1595.

In one embodiment, the coprocessor 1545 is a special-purpose processor, such as, for example, a high-throughput MIC processor, a network or communication processor, compression engine, graphics processor, GPGPU, embedded processor, or the like. In one embodiment, controller hub 1520 may include an integrated graphics accelerator.

There can be a variety of differences between the physical resources 1510, 1515 in terms of a spectrum of metrics of merit including architectural, microarchitectural, thermal, power consumption characteristics, and the like.

In one embodiment, the processor 1510 executes instructions that control data processing operations of a general type. Embedded within the instructions may be coprocessor instructions. The processor 1510 recognizes these coprocessor instructions as being of a type that should be executed by the attached coprocessor 1545. Accordingly, the processor 1510 issues these coprocessor instructions (or control signals representing coprocessor instructions) on a coprocessor bus or other interconnect, to coprocessor 1545. Coprocessor(s) 1545 accept and execute the received coprocessor instructions.

Figure 16:
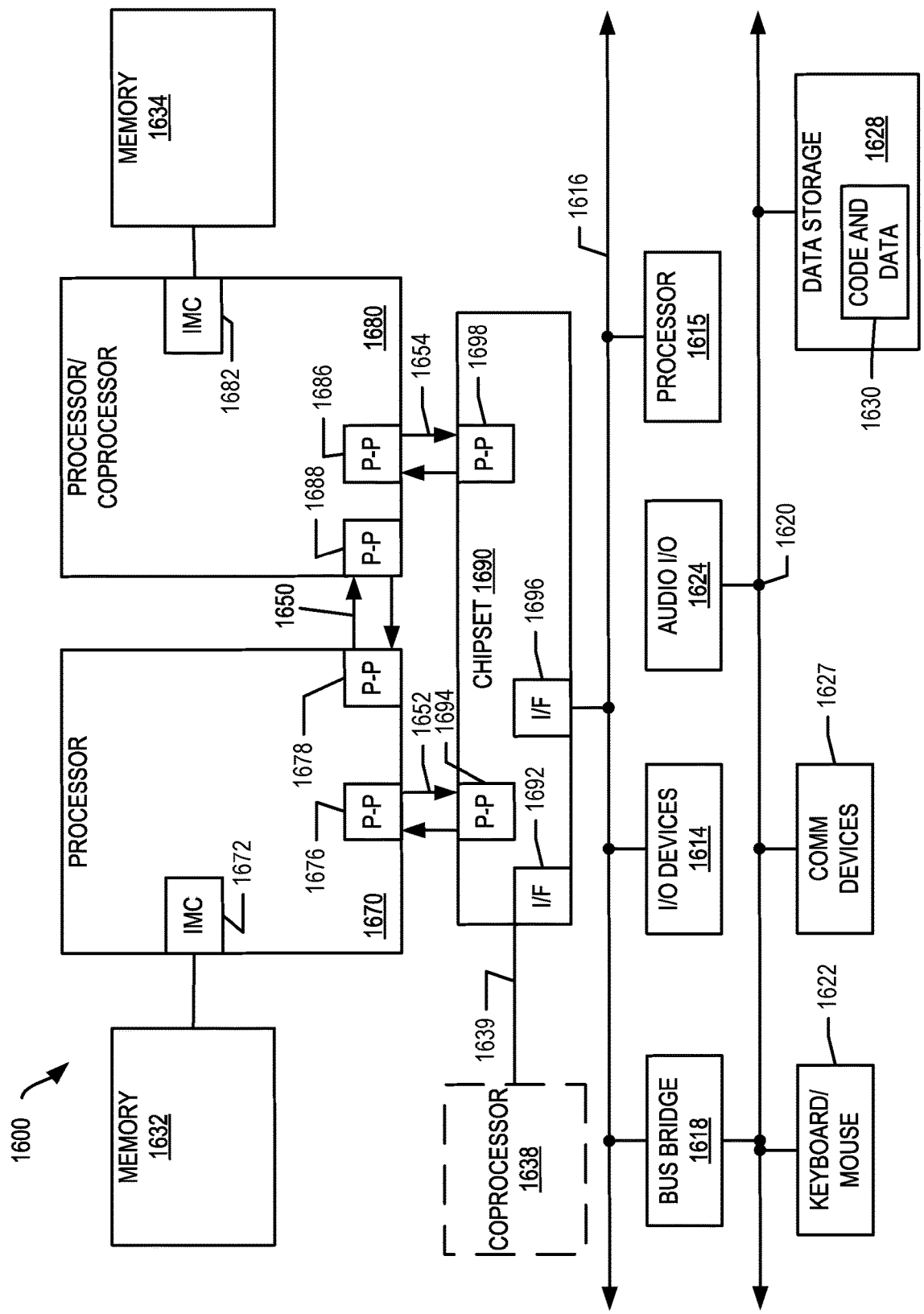
FIG. 16 is a block diagram of a more specific exemplary system in accordance with an embodiment of the present disclosure.

Referring now to FIG. 16, shown is a block diagram of a first more specific exemplary system 1600 in accordance with an embodiment of the present disclosure. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of the processor 1400. In one embodiment of the disclosure, processors 1670 and 1680 are respectively processors 1510 and 1515, while coprocessor 1638 is coprocessor 1545. In another embodiment, processors 1670 and 1680 are respectively processor 1510 coprocessor 1545.

Processors 1670 and 1680 are shown including integrated memory controller (IMC) units 1672 and 1682, respectively. Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 may each exchange information with a chipset 1690 via individual P-P interfaces 1652, 1654 using point to point interface circuits 1676, 1694, 1686, 1698. Chipset 1690 may optionally exchange information with the coprocessor 1638 via a high-performance interface 1639. In one embodiment, the coprocessor 1638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present disclosure is not so limited.

As shown in FIG. 16, various I/O devices 1614 may be coupled to first bus 1616, along with a bus bridge 1618 which couples first bus 1616 to a second bus 1620. In one embodiment, one or more additional processor(s) 1615, such as coprocessors, high-throughput MIC processors, GPGPU's, accelerators (such as, e.g., graphics accelerators or digital signal processing (DSP) units), field programmable gate arrays, or any other processor, are coupled to first bus 1616. In one embodiment, second bus 1620 may be a low pin count (LPC) bus. Various devices may be coupled to a second bus 1620 including, for example, a keyboard and/or mouse 1622, communication devices 1627 and a storage unit 1628 such as a disk drive or other mass storage device which may include instructions/code and data 1630, in one embodiment. Further, an audio I/O 1624 may be coupled to the second bus 1620. Note that other architectures are possible. For example, instead of the point-to-point architecture of FIG. 16, a system may implement a multi-drop bus or other such architecture.

Figure 17:
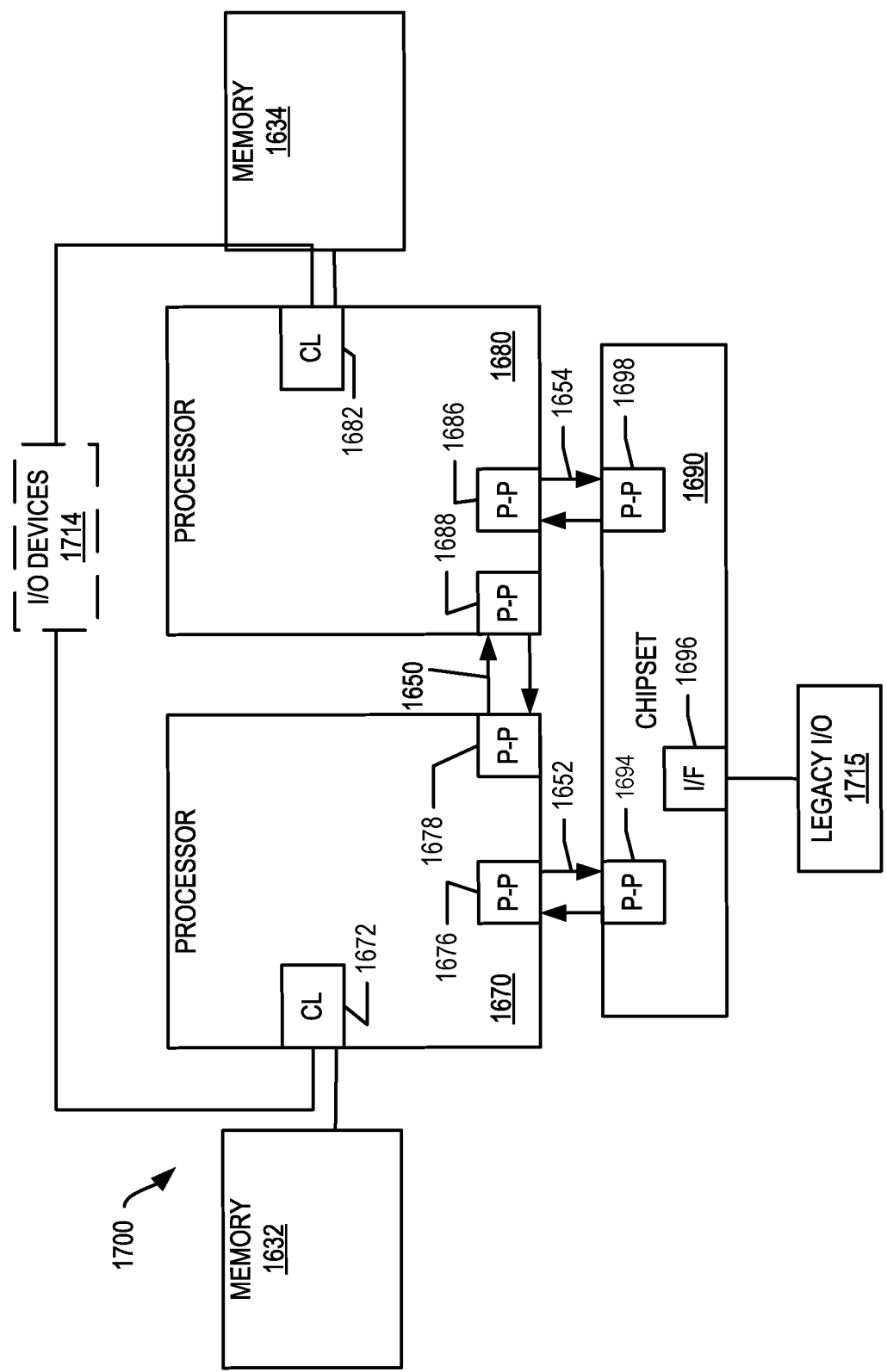
FIG. 17, shown is a block diagram of a second more specific exemplary system in accordance with an embodiment of the present disclosure.

Referring now to FIG. 17, shown is a block diagram of a second more specific exemplary system 1700 in accordance with an embodiment of the present disclosure Like elements in FIGS. 16 and 17 bear like reference numerals, and certain aspects of FIG. 16 have been omitted from FIG. 17 in order to avoid obscuring other aspects of FIG. 17.

FIG. 17 illustrates that the processors 1670, 1680 may include integrated memory and I/O control logic ("CL") 1672 and 1682, respectively. Thus, the CL 1672, 1682 include integrated memory controller units and include I/O control logic. FIG. 17 illustrates that not only are the memories 1632, 1634 coupled to the CL 1672, 1682, but also that I/O devices 1714 are also coupled to the control logic 1672, 1682. Legacy I/O devices 1715 are coupled to the chipset 1690.

Figure 18:
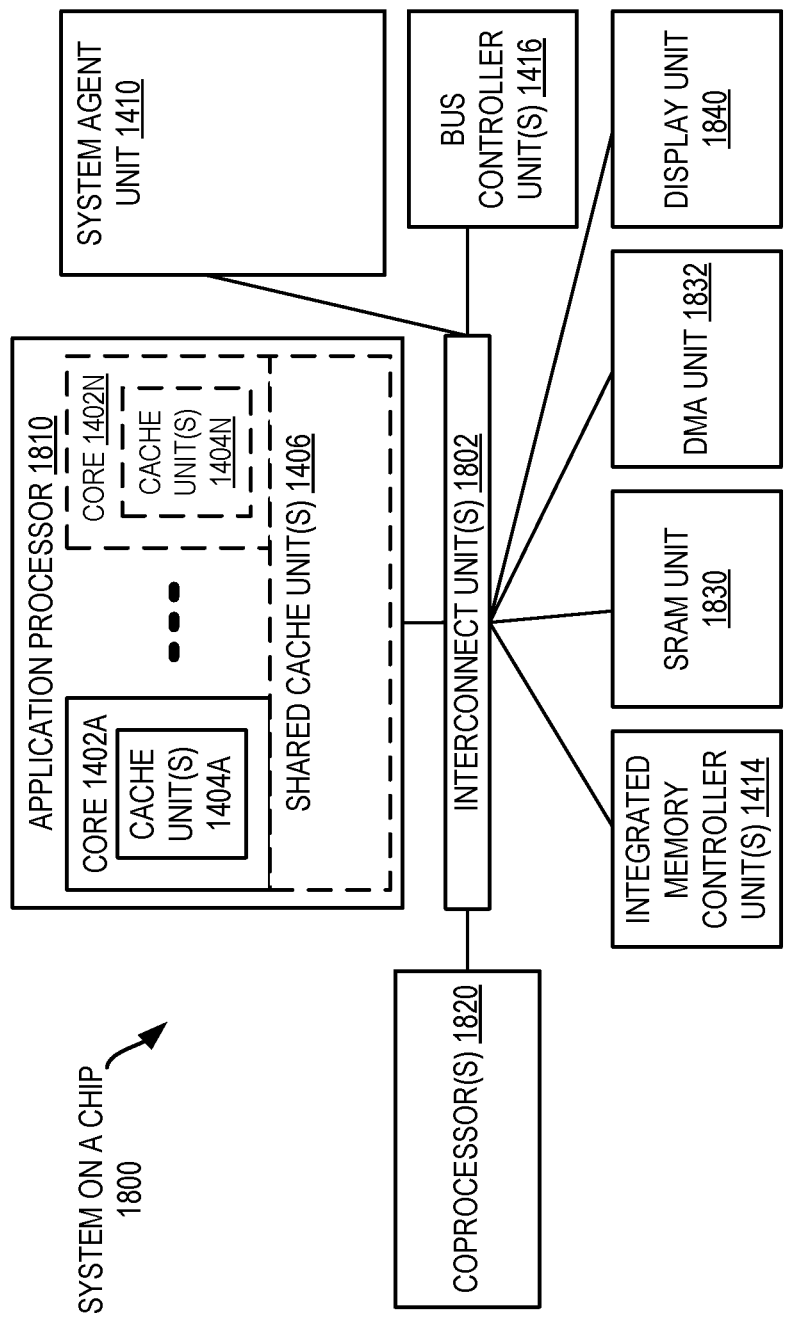
FIG. 18, shown is a block diagram of a system on a chip (SoC) in accordance with an embodiment of the present disclosure.

Referring now to FIG. 18, shown is a block diagram of a SoC 1800 in accordance with an embodiment of the present disclosure. Similar elements in FIG. 14 bear like reference numerals. Also, dashed lined boxes are optional features on more advanced SoCs. In FIG. 18, an interconnect unit(s) 1802 is coupled to: an application processor 1810 which includes a set of one or more cores 202A-N and shared cache unit(s) 1406; a system agent unit 1410; a bus controller unit(s) 1416; an integrated memory controller unit(s) 1414; a set or one or more coprocessors 1820 which may include integrated graphics logic, an image processor, an audio processor, and a video processor; an static random access memory (SRAM) unit 1830; a direct memory access (DMA) unit 1832; and a display unit 1840 for coupling to one or more external displays. In one embodiment, the coprocessor(s) 1820 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1630 illustrated in FIG. 16, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 19:
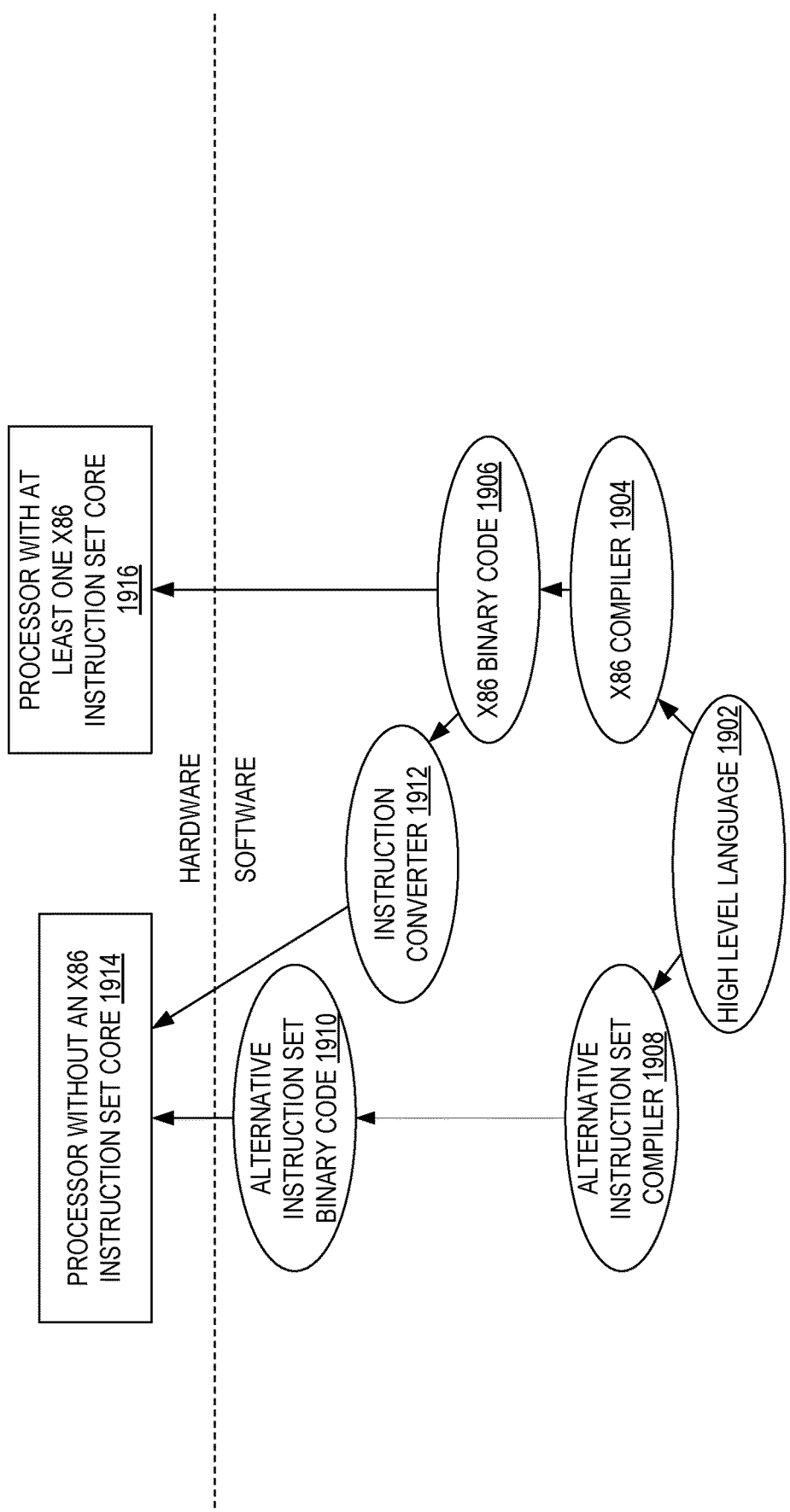
FIG. 19 is a block diagram contrasting the use of a software instruction converter to convert binary instructions in a source instruction set to binary instructions in a target instruction set according to embodiments of the disclosure.

FIG. 19 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 19 shows a program in a high level language 1902 may be compiled using an x86 compiler 1904 to generate x86 binary code 1906 that may be natively executed by a processor with at least one x86 instruction set core 1916. The processor with at least one x86 instruction set core 1916 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1904 represents a compiler that is operable to generate x86 binary code 1906 (e.g., object code) that can, with or without additional linkage processing, be executed on the processor with at least one x86 instruction set core 1916. Similarly, FIG. 19 shows the program in the high level language 1902 may be compiled using an alternative instruction set compiler 1908 to generate alternative instruction set binary code 1910 that may be natively executed by a processor without at least one x86 instruction set core 1914 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1912 is used to convert the x86 binary code 1906 into code that may be natively executed by the processor without an x86 instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have an x86 instruction set processor or core to execute the x86 binary code 1906.

What is claimed is:

1. An apparatus comprising:
    a first input-output memory management circuit to couple a first device to memory;
    a second input-output memory management circuit to couple a second device to the memory; and
    a processor to:
        execute a virtual machine monitor that is not in a trusted computing base for one or more virtual machines to be managed by the virtual machine monitor, and
        execute secure arbitration mode firmware, separate from the virtual machine monitor, to cause a first unique identification value to be assigned for the first input-output memory management circuit, a second unique identification value to be assigned for the second input-output memory management circuit, send the first unique identification value to the first device during a secure assignment of the first device to a first trusted domain of the memory, and send the second unique identification value to the second device during a secure assignment of the second device to a second trusted domain of the memory.

2. The apparatus of claim 1, wherein only execution of the secure arbitration mode firmware causes the first unique identification value to be assigned for the first input-output memory management circuit or the second unique identification value to be assigned for the second input-output memory management circuit.

3. The apparatus of claim 1, wherein the first unique identification value and the second unique identification value are stored in a protected register that is only accessible by the secure arbitration mode firmware.

4. The apparatus of claim 1, wherein the first device and a third device coupled to the memory have a same requester identification value.

5. The apparatus of claim 4, wherein the processor is to execute the secure arbitration mode firmware to cause a request to be sent from the processor to the third device for an identification value, and block access for the third device unless the third device sends the first unique identification value in a response message.

6. The apparatus of claim 1, wherein the processor is to execute the secure arbitration mode firmware to cause a request to be sent from the processor to a device coupled to the memory, and allow memory access to the first trusted domain of the memory by the device only when the device sends the first unique identification value in a response message.

7. The apparatus of claim 6, wherein the memory access is a direct memory access by the device.

8. The apparatus of claim 6, wherein, when the device sends the first unique identification value in the response message, the processor is to execute the secure arbitration mode firmware to select a trusted root pointer to use to perform the device to first input-output memory management circuit attachment.

9. A method comprising:
coupling a first device to memory with a first input-output memory management circuit;
coupling a second device to the memory with a second input-output memory management circuit;
assigning a first unique identification value for the first input-output memory management circuit by a processor in a secure arbitration mode separate from a virtual machine monitor, of the processor, that is removed from a trusted computing base for one or more virtual machines managed by the virtual machine monitor;
assigning a second unique identification value for the second input-output memory management circuit by the processor in the secure arbitration mode separate from the virtual machine monitor, of the processor, that is removed from the trusted computing base for the one or more virtual machines managed by the virtual machine monitor;
sending the first unique identification value to the first device during a secure assignment of the first device to a first trusted domain of the memory by the processor in the secure arbitration mode; and
sending the second unique identification value to the second device during a secure assignment of the second device to a second trusted domain of the memory by the processor in the secure arbitration mode.

10. The method of claim 9, wherein only the processor in the secure arbitration mode causes the first unique identification value to be assigned for the first input-output memory management circuit and the second unique identification value to be assigned for the second input-output memory management circuit.

11. The method of claim 9, further comprising the processor in the secure arbitration mode storing the first unique identification value and the second unique identification value in a protected register that is only accessible by the processor in the secure arbitration mode.

12. The method of claim 9, wherein the first device and a third device coupled to the memory have a same requester identification value.

13. The method of claim 12, further comprising the processor in the secure arbitration mode causing a request to be sent from the processor to the third device for an identification value, and blocking access for the third device unless the third device sends the first unique identification value in a response message.

14. The method of claim 9, further comprising the processor in the secure arbitration mode causing a request to be sent from the processor to a device coupled to the memory, and allow memory access to the first trusted domain of the memory by the device only when the device sends the first unique identification value in a response message.

15. The method of claim 14, wherein the memory access is a direct memory access by the device.

16. The method of claim 14, wherein, when the device sends the first unique identification value in the response message, the processor in the secure arbitration mode selects a trusted root pointer to use to perform the device to first input-output memory management circuit attachment.

17. A non-transitory machine readable medium that stores code that when executed by a machine causes the machine to perform a method comprising:
coupling a first device to memory with a first input-output memory management circuit;
coupling a second device to the memory with a second input-output memory management circuit;
assigning a first unique identification value for the first input-output memory management circuit by a processor in a secure arbitration mode separate from a virtual machine monitor, of the processor, that is removed from a trusted computing base for one or more virtual machines managed by the virtual machine monitor;
assigning a second unique identification value for the second input-output memory management circuit by the processor in the secure arbitration mode separate from the virtual machine monitor, of the processor, that is removed from the trusted computing base for the one or more virtual machines managed by the virtual machine monitor;
sending the first unique identification value to the first device during a secure assignment of the first device to a first trusted domain of the memory by the processor in the secure arbitration mode; and
sending the second unique identification value to the second device during a secure assignment of the second device to a second trusted domain of the memory by the processor in the secure arbitration mode.

18. The non-transitory machine readable medium of claim 17, wherein only the processor in the secure arbitration mode causes the first unique identification value to be assigned for the first input-output memory management circuit and the second unique identification value to be assigned for the second input-output memory management circuit.

19. The non-transitory machine readable medium of claim 17, further comprising the processor in the secure arbitration mode storing the first unique identification value and the second unique identification value in a protected register that is only accessible by the processor in the secure arbitration mode.

20. The non-transitory machine readable medium of claim 17, wherein the first device and a third device coupled to the memory have a same requester identification value.

21. The non-transitory machine readable medium of claim 20, further comprising the processor in the secure arbitration mode causing a request to be sent from the processor to the third device for an identification value, and blocking access for the third device unless the third device sends the first unique identification value in a response message.

22. The non-transitory machine readable medium of claim 17, further comprising the processor in the secure arbitration mode causing a request to be sent from the processor to a device coupled to the memory, and allow memory access to the first trusted domain of the memory by the device only when the device sends the first unique identification value in a response message.

23. The non-transitory machine readable medium of claim 22, wherein the memory access is a direct memory access by the device.

24. The non-transitory machine readable medium of claim 22, wherein, when the device sends the first unique identification value in the response message, the processor in the secure arbitration mode selects a trusted root pointer to use to perform the device to first input-output memory management circuit attachment.

* * * * *